United States Patent [19]
Henzinger et al.

[11] Patent Number: 5,857,097
[45] Date of Patent: Jan. 5, 1999

[54] METHOD FOR IDENTIFYING REASONS FOR DYNAMIC STALL CYCLES DURING THE EXECUTION OF A PROGRAM

[75] Inventors: Monika Hildegard Henzinger, Menlo Park; Shun-Tak Albert Leung, Mountain View; Richard L. Sites, Menlo Park; Mark T. Vandevoorde, Sunnyvale; William Edward Weihl, San Francisco, all of Calif.

[73] Assignee: Digital Equipment Corporation, Maynard, Mass.

[21] Appl. No.: 814,190

[22] Filed: Mar. 10, 1997

[51] Int. Cl.⁶ .............................. G06F 11/34; G06F 11/00
[52] U.S. Cl. ....................................... 395/583; 395/184.01
[58] Field of Search .................................. 395/392, 395, 395/583, 183.13, 184.01

[56] References Cited

PUBLICATIONS

"Guide to IPROBE, Installing and Using, " CSG Performance Group, Tools Group, Nov. 1994, Digital Equipment Corp.

"Performance Analysis Using the MIPS R10000 Performance Counters, " Zagha et al., Silicon Graphics Inc., Mountain View, Calif. {marcoz,brond,swt, martyi}@sgi.com.

"The Program Structure Tree: Computing Control Regions in Linear Time," Johnson et al., Dept. of Computer Science, Cornell Univ., SIGPLAN 94–6/94 Orlando, Florida, copyright 1994 ACM 0–89791–662–x/940006.

*Primary Examiner*—Krisna Lim

[57] ABSTRACT

In a computerized method, performance data collected while a computer system executed instructions of a program are analyzed. The method collects performance data while executing the program. The performance data includes sample counts of instructions executed. The program is analyzed to determine classes of instructions. Instructions of the same equivalence class all execute the identical number of times. The execution frequencies for each instructions of each equivalence class is estimated. The estimated execution frequencies can then be used to determine the average number of cycles required to issue each instruction of each equivalence class. The average number of cycles can be compared with the minimum number of cycles to determine the number of dynamic stall cycles incurred by the instructions. Furthermore, reasons for the dynamic stall cycles can be inferred.

30 Claims, 17 Drawing Sheets

METHOD FOR IDENTIFYING REASONS FOR DYNAMIC STALL CYCLES DURING THE EXECUTION OF A PROGRAM

FIELD OF THE INVENTION

The present invention relates generally to computer systems, and more particularly to analyzing performance data of computer systems.

BACKGROUND OF THE INVENTION

Measuring the performance of an operating computer system is a frequent and extremely important task performed by hardware and software engineers. Hardware engineers need performance data to determine how new computer hardware operates with existing operating systems and application programs. Software engineers need to identify critical portions of operating system, kernel, device driver, and application software programs.

It is a particular problem to measure the performance of modern high-speed pipelined multi-processor system. In a pipelined multi-processor system, multiple instructions may be issued for each processor cycle. A processor cycle is the basic timing interval for processor operations. Barring stalls, instructions advance one stage through the pipeline for each cycle. Then, ideally, the system is operating most efficiently. This means, that at any one time multiple instructions can concurrently be executing in the various pipelines. Generally, the operator code and operands of an instruction determine how many processor cycles are required to completely execute the instruction. However, the operator code does not indicate how many cycles will be required to issue the instruction, this can only be determined dynamically while the instruction is executing.

However, some instructions may interfere with each other. For example, a next load, or conditional branch instruction may require the results of an as yet uncompleted instruction. In other cases, instructions may be waiting for a processor resource such as a particular floating-point arithmetic unit. In these cases, execution of the later instruction is stalled until the other instruction completes or the resource becomes available. While an instruction is stalled, decoding and processing are suspended, and the processor is operating less efficiently. That is, the number of cycles required to complete the execution of an instruction may be greater than ideally determined.

A profiling system can be used to collect performance data on how frequently instructions are executed. Some prior art profiling systems require that source or object programs be modified to insert instructions which can collect the data when the programs are executing. Modifying the programs means that the programs need to be recompiled and/or relinked.

In addition, prior art profiling systems generally only determine the frequency of execution of particular instructions, and not the number of cycles that are required to issue the instructions. In a pipelined multi-processor system, the number of cycles required to issue the various instructions is a significant indicator of the performance of the system.

As a further restriction of some known systems, profiles can only be generated for instructions of an application program This means that when the application program calls an operating system procedure no performance data on actual instructions executed by the system procedure are collected. Some profiling may measure the amount of time it took to process the system call, and attempt to infer performance data by dividing the time for processing a system call by some "average" execution time of instructions, however nothing concrete is learned about the actual execution of instructions of system procedures.

Therefore, it is desired to profile machine executable programs without having to modify source or object code files so profiled programs do not need to be recompiled or linked. Furthermore it is desired to profile both application and system (kernel) level programs. In addition, it is desired to profile not only the number of times each instructions is executed, but also the average number of stall cycles incurred when each instruction is issued, and the reasons why those stalls occurred.

SUMMARY OF THE INVENTION

The invention provides a computerized method for analyzing performance data of a computer system The performance data, which includes normalized sample counts of instructions executed, is collected while executing the program. The program is analyzed to determine equivalence classes of instructions. In an equivalence class of instructions, all instructions are executed an identical number of times.

Execution frequencies for the instructions of each equivalence class are estimated. The execution frequencies can be used to determine the average number of cycles required to issue each instruction of each equivalence class. The minimum number of cycles required to issue each instruction is also determined. By subtracting the minimum from the average "measured" number of cycles, the number of dynamic stall cycles incurred by the each instruction can be determined. For instructions which experience dynamic stall cycles, the reasons for the dynamic stall cycles can be inferred by an elimination process.

In one aspect of the invention, the program is represented as a control flow graph having nodes and arcs. In the graph, each node represents a basic component of the program, and the arcs connecting the nodes represent execution flows between the basic components. Some of the nodes are identified as basic blocks. Each instruction of a particular basic block is executed an identical number of times so all of the instructions of the particular basic block form an equivalence class of instructions. All nodes which have identical execution frequencies can be assigned to the same equivalence class making the equivalence classes as large as possible.

In another aspect of the invention, related nodes and arcs of the control flow graph that represent a procedure of the program are identified. In addition, an entry node and an exit node of the procedure are identified. The flow graph is augmented by connecting the entry and exit nodes of the procedure to each other. Then, the flow graph is decomposed into strongly connected sub-graphs. A particular strongly connected sub-graph is identified as a dead-end component if there are no arcs from any of the nodes of the strongly connected sub-graph to any other node of the procedure. All arcs entering any dead-end component are redirected to the exit node of the procedure. Then, a generalized method can be used to identify cycle equivalent nodes and arc of the augmented control flow graph to determine the frequency equivalence classes.

The minimum number of cycles can be determined by ideally scheduling the instructions of the program using a model scheduler. This minimum number includes any cycles which are incurred due to static stalls, that is stalls which can be determined prior to execution of the program. Then, the sample count of each instruction can be divided by the execution frequency of the instruction to determine the average number of cycles required to issue each instruction. Subtracting the minimum number of cycles from the average number of cycles for each instruction yields the dynamic stall cycles incurred by each instruction of the program.

Once instructions which incur dynamic stall cycles have been identified, all possible reasons that could cause a particular instruction to incur dynamic stall cycles can be inferred by an elimination process. Depending on a particular stall, the process can eliminate reasons such as Instruction-cache misses, Data-cache misses, branch mispredictions, process synchronizations, execution unit conflicts, and write buffer overflows, and the like.

DETAILED DESCRIPTION OF PREFERRED EMBODIMENTS

System Overview

Figure 1:
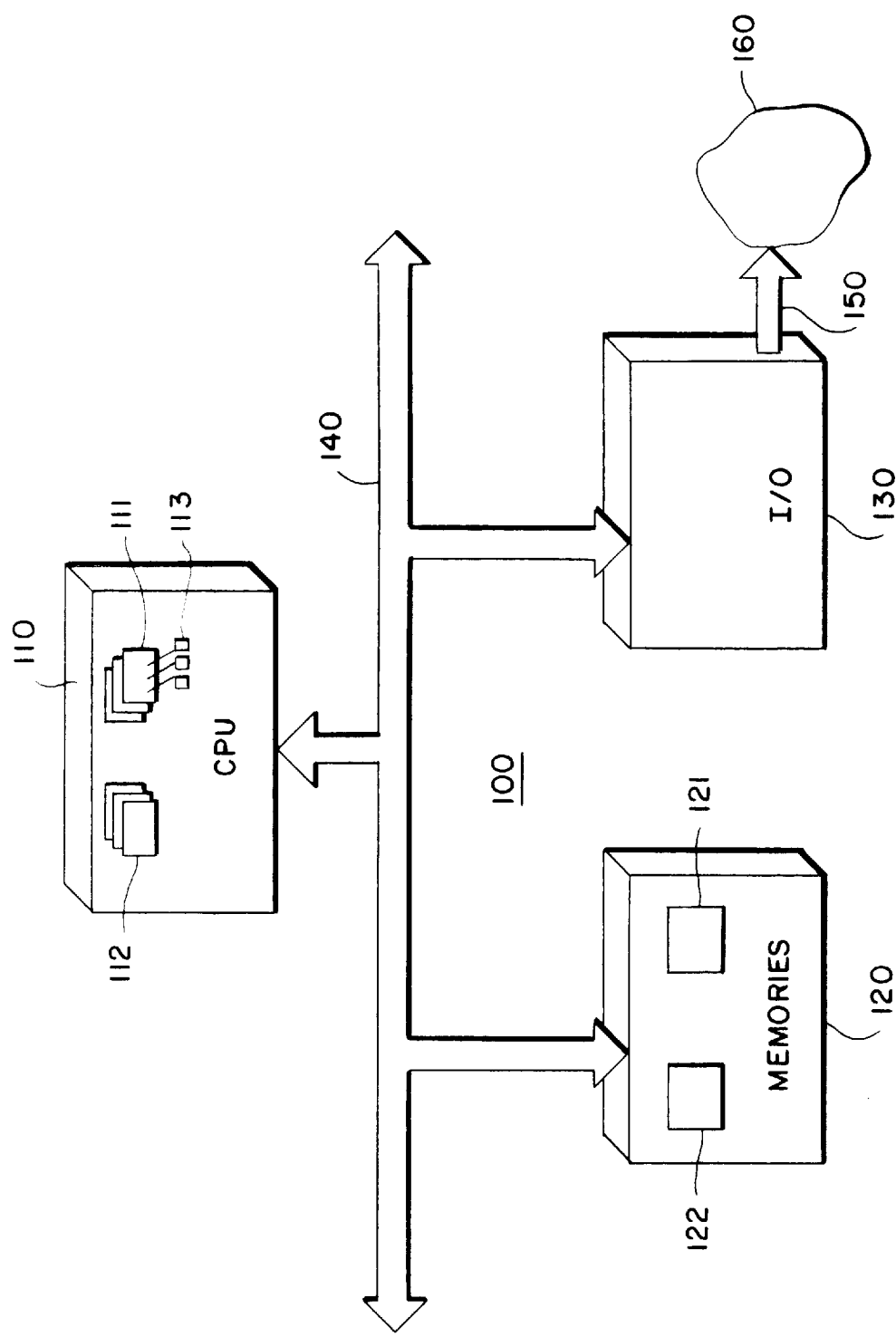
FIG. 1 is a block diagram of a computer system whose operation can be profiled by a profiling sub-system according to the invention.

As shown in FIG. 1, a computer system 100 includes a central processing unit (CPU) 110, a memory sub-system (memories) 120, input/output interfaces (I/O) 130 connected to each other by a bus 140. The system 100 can be an embedded system, a PC, a workstation, a mainframe, or a cluster of computer systems linked by a network.

In a preferred embodiment, the CPU 110 includes one or more individual processor chips 111 designed to use high-speed pipelines. With a pipeline, each processor 111 can concurrently issue and operate on multiple instructions using multiple execution units 113. The execution units 113 can perform different operations such as integer arithmetic, floating-point arithmetic, loads, stores, branches, and the like. Typically, pipelined processors use RISC architectures. With a pipelined architecture, instructions are fetched from memory, scheduled into an issue queue, executed, and then retired.

Associated with each processor 111 is a set of performance counters 112. Each set of counters 112 can be implemented as a plurality of registers. The registers can count the occurrences of significant events in the system which are indicative of the system's performance, for example, instructions executed. The registers can be incremented, and on overflow, the registers can interrupt, so that the counts stored in the registers can be sampled as performance data.

The memory sub-system 120 can include static, dynamic, random, sequential, volatile, and persistent storage elements, or combinations thereof. The storage elements can be registers, caches, DRAM, disk, tape, and the like. The caches can include instruction and data caches (I-caches and D-caches) which may be co-resident with a processor on the same processor chip.

The memories 120 store software programs 121 in the form of machine executable instructions, and data 122 accessed by the instructions. The software programs 121 can include operating system, device driver, and application programs, as well as programs used to measure and analyze the performance data of the system 100 as described in greater detail below.

The I/O 130 can include interfaces to input and output devices such as printers, terminals, keyboards. The I/O 130 can also connect via lines 150 to a network for communicating data with other computer systems.

The bus 140 typically is implemented as a plurality of lines for carrying address, data, control, and timing signals between the various system components.

General Operation

During operation of the system 100, the instructions of the programs 121 are executed by the processors 111. Each instruction includes an operator code which tells what operation is to be performed by the instruction. The instruction can also include one or more operands for referencing additional data to be used during the operation. The instructions generally either control the execution flow of the programs, or access (read and write) data. To accelerate processing, the processors may also include branch prediction logic, not shown. The branch prediction logic attempts to load instructions in an expected order of execution. It is desired to generate a profile of programs executing in the system 100 without significantly disturbing the normal operating environment. The profile, in the preferred embodiment, includes an indication of the average number of dynamic stall cycles incurred by each of the various instructions of the programs 121. As an advantage, the average number of dynamic stall cycles for each instruction can be used to determine possible dynamic causes for instruction stalls in the issue queues of the processors.

Profiling Sub-System

Figure 2:
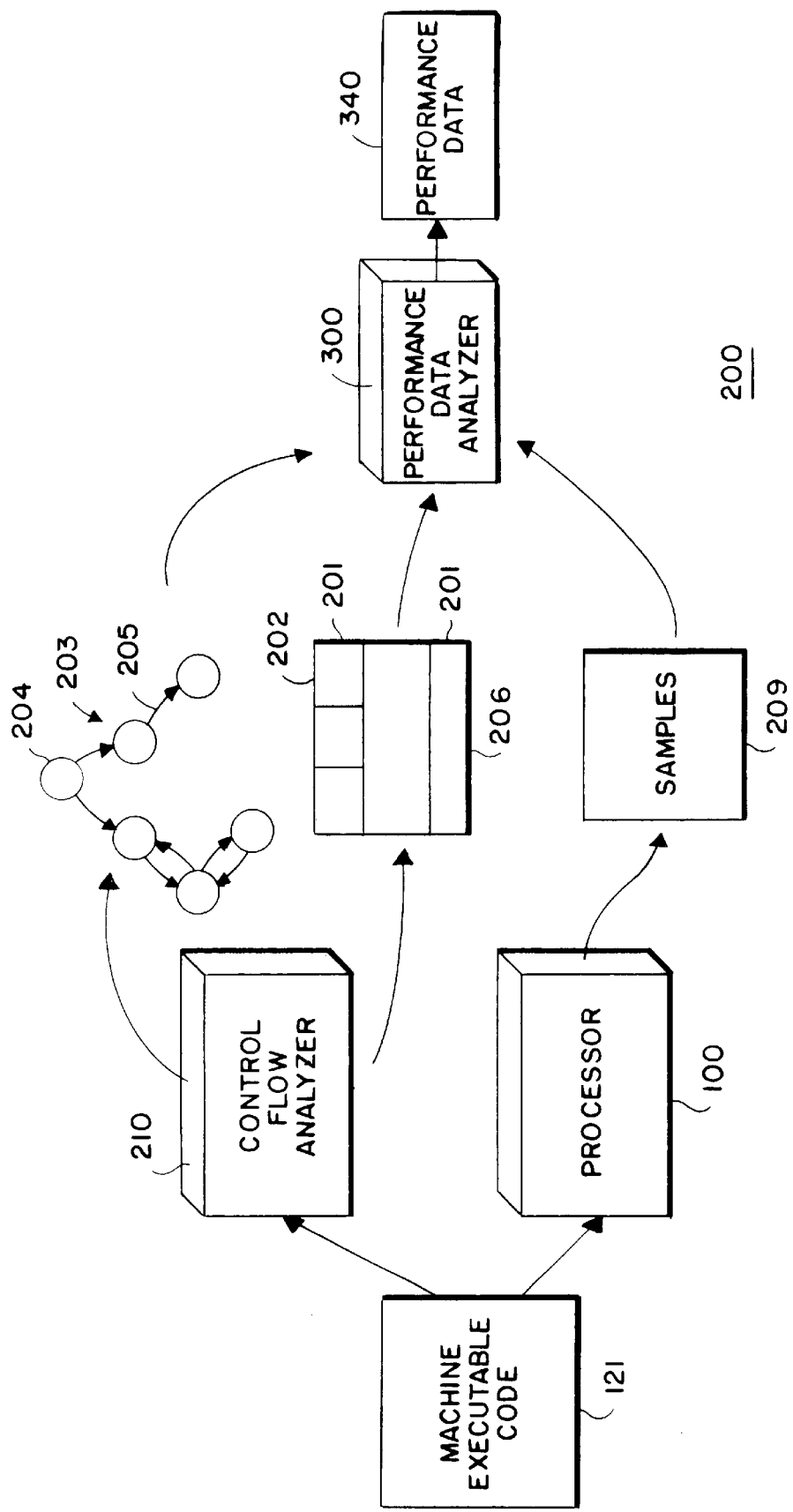
FIG. 2 is a flow diagram of the profiling sub-system.

FIG. 2 shows a flow diagram of the sub-system 200 according to the preferred embodiment of the invention. The sub-system 200 includes a control flow analyzer module 210 and a performance data analyzer 300.

Programs 121 in the form of machine executable code are presented to the control flow analyzer module 210. The programs 121 can include kernel and application programs, e.g., an entire executable "binary image." An example process for analyzing machine code is described in U.S. Pat. No. 5,539,907, System for Monitoring Computer System Performance, issued to Srivastava et al. on Jul. 23, 1996.

The control flow analyzer 210 partitions the code 121 into a data structure 206. The structure 206 includes procedures 201, and the procedures 201 can include basic blocks 202. The partitioned structure 206 can include information to identify the procedures and the basic blocks. Typically, a procedure has a single entry point and a single exit point. A basic block 202 is defined as a group or set of instructions that are all executed if the first instruction of the set is executed. In other words, if the execution frequency of any one instruction of the basic block is known, then the execution frequency of all of the instructions of the block are known, since all of the instructions execute an identical number of times. Therefore, the instructions of such a basic block are said to belong to the same frequency equivalence class.

In rare cases, the various instructions in a basic block can be executed a different number of times. This means that a basic block does not automatically constitute an equivalence class. For example, if an interrupt or exception condition occurs in the middle of the block but there is no return from the interrupt or exception, then the earlier instructions in the block will be executed more often than the later instructions. The distortion introduced by such interrupts and exceptions is usually minor and can be ignored, except in the very unlikely circumstance that the distortions are correlated with particular instructions in the code and are also frequent.

The instructions of procedures 201 and the basic blocks 202 are further analyzed to form control flow graphs (CFG) 203. For example, by identifying instructions such as branches and jumps, the execution flow between procedures and basic blocks can be determined. In the CFG 203, nodes 204 (circles) represent procedures or basic blocks, and edges 205 (directed arcs) connecting the nodes represent executions flows between the nodes. The control flow graph 203 is used to determine frequency equivalence classes for basic blocks and arcs. By examining both basic blocks and arcs, frequency equivalence classes can be made as large as possible.

In addition to analyzing the machine executable code 121, the code 121 is also loaded into the system 100 for execution. During execution, the performance counters 112 of FIG. 1 can be sampled to generate samples 209. The samples can indicate, for example, the average number of processor cycles to issue each instruction of the code 121. The average number of cycles actually required for issuance can be compared with the number of cycles required during an ideal execution of the program to determine possible causes of pipeline stalls.

The CFG 203, the structure 206, and the samples 209 are presented to the performance data analyzer 300. The performance data analyzer 300 produces performance data 340, for example, for each instruction the performance data can include the frequency of execution, the average number of cycles required to issue the instruction (cpi), and possible causes for any pipeline stalls.

Sampling Performance Data

Figure 3:
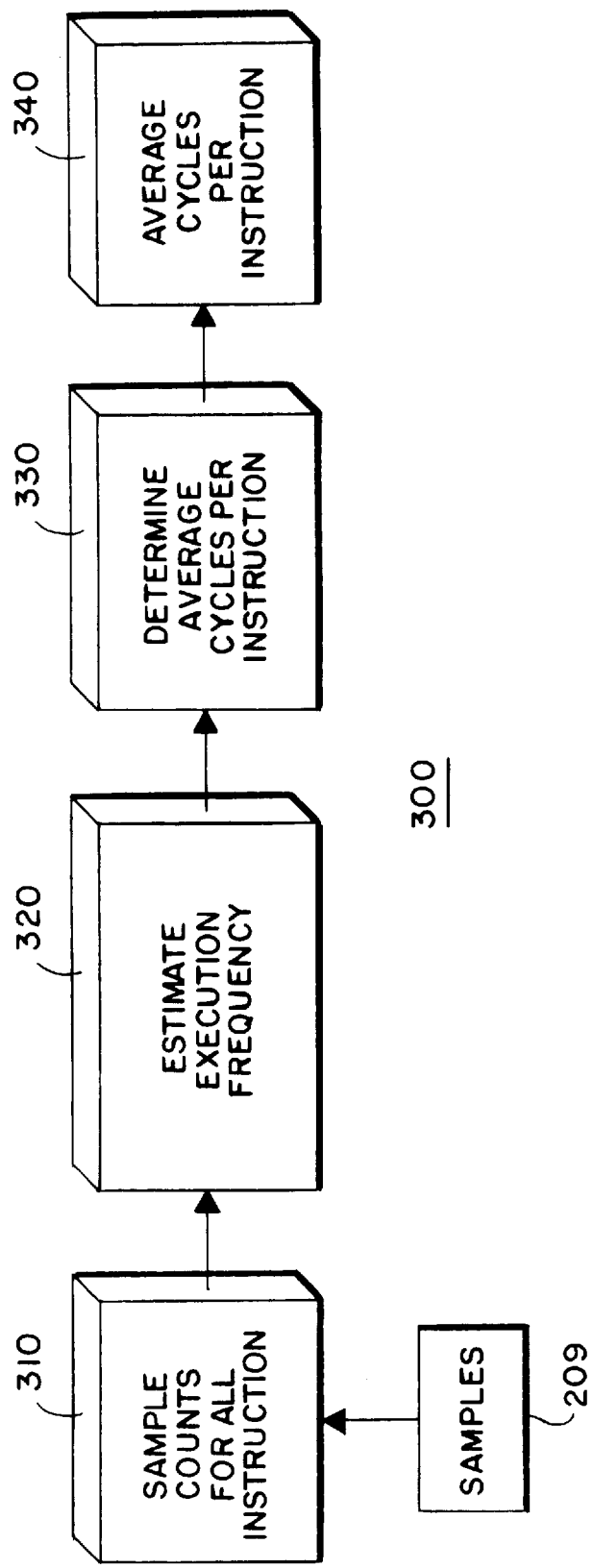
FIG. 3 is a block diagram of a process for determining the average number of cycles required to issue each instruction of the program.

As shown in FIG. 3, the performance data analyzer 300 collects the sample counts 209 for the instructions of the code executed in step 310. The performance data can be collected by any known profiling system. In step 320, an execution frequency of the instructions executed is estimated based on the sample counts. During step 330, the average of the number of cycles 340 for each instruction is determined. The average number of cycles is a good indicator of how well instructions are scheduled, and how frequently stalls occur. This information can be used to improve the design of the hardware and software of the system 100 and to determine causes of dynamic pipeline stalls.

Frequency Estimates Introduced

Figure 4:
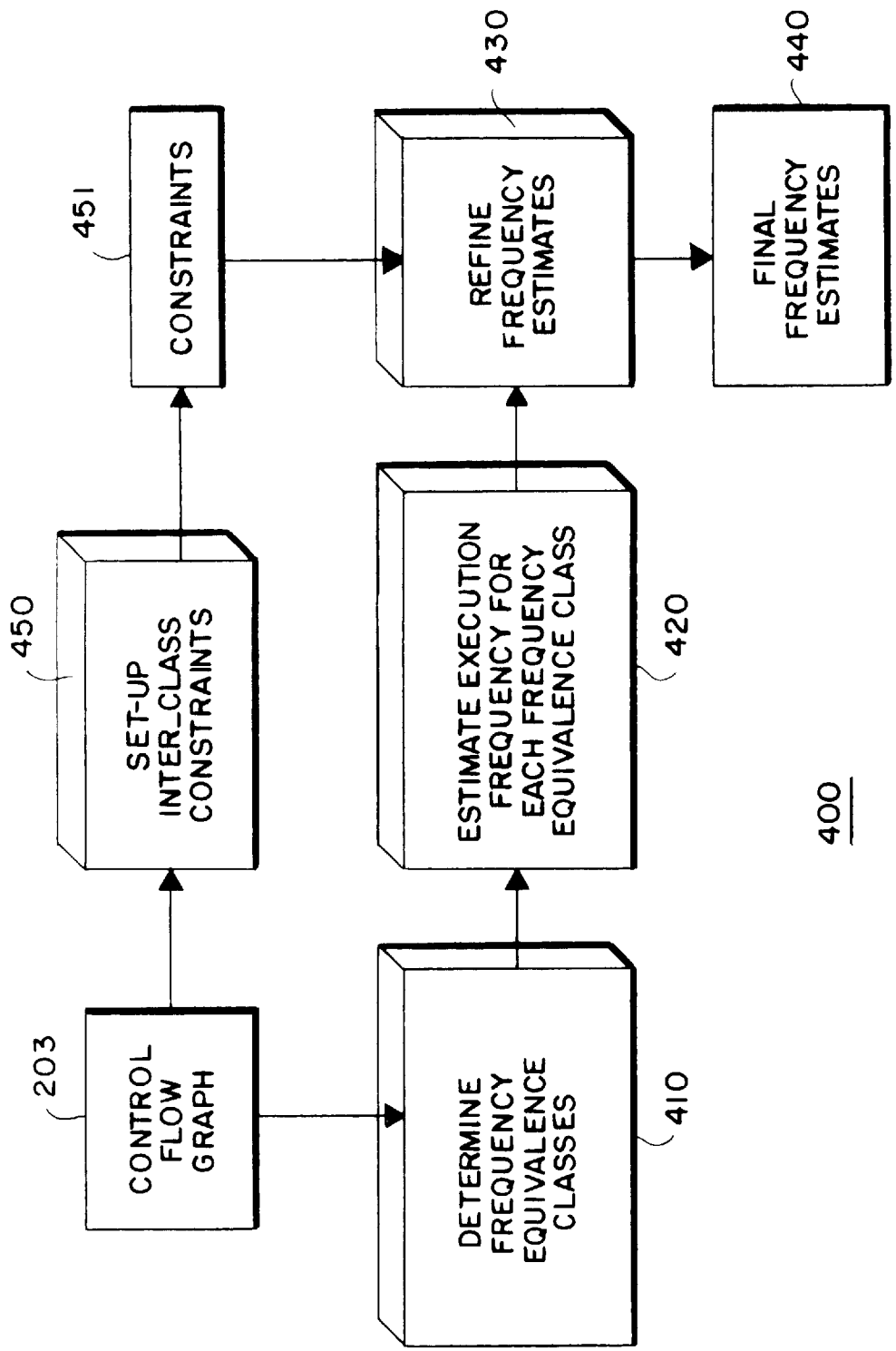
FIG. 4 is a block diagram of a process for estimating execution frequencies.

FIG. 4 shows the sub-steps 400 of step 320 of FIG. 3. In step 410 using the control flow graph 203, the instructions of the code 121 are grouped into frequency equivalence classes. A frequency equivalence class, as stated above, is a set of instructions or arcs which are known to have identical execution frequencies, e.g., instructions which get executed the same number of times. Arcs in the same equivalence class are traversed the same number of times. For example, if it is known how frequently a basic block is executed, than the execution frequency of each instruction of the basic block is also known.

The execution frequency for each frequency equivalence class of instructions is estimated in step 420 to determine initial frequency estimates. The initial frequency estimates are refined in step 430 to produce final frequency estimates 440. The estimates are refined by locally and globally propagating the estimated frequencies between the equivalence classes using inter-class constraints 451. The inter-class constraints 451 are derived from the control flow graph 203 in a setup step 450 described below.

Control Flow Graph Processing

Figure 5A:
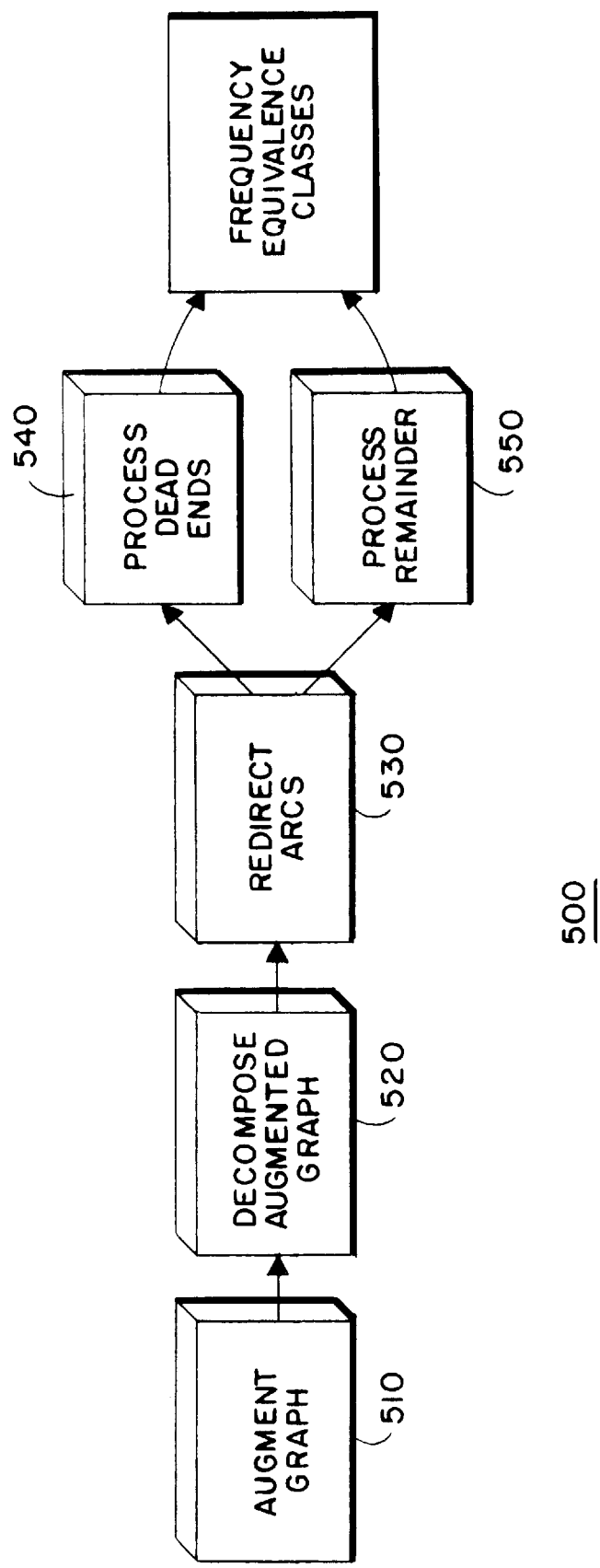
FIG. 5a is a block diagram of a process for determining equivalence classes of instructions.
Figure 5B:
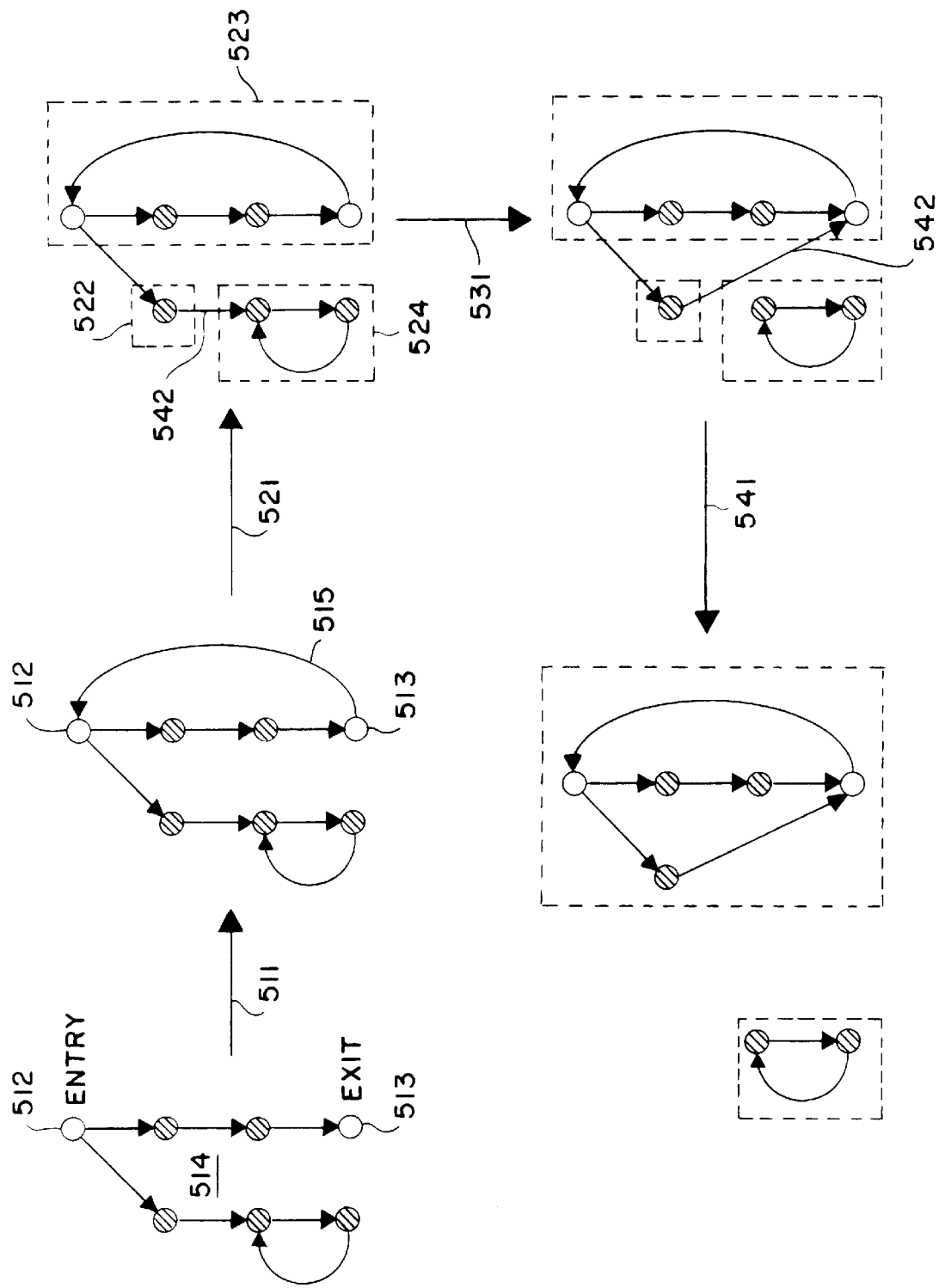
FIG. 5b is a diagram of augmented control flow graphs.

FIGS. 5a and 5b will be used to describe the sub-steps 500 of step 410 of FIG. 4 in greater detail. The goal of step 410 is to group instructions and arcs into frequency equivalent classes based on an analysis of the control flow graph 203.

By definition, instructions are frequency equivalent if they are executed the same number of times in any execution of the program Similarly, basic blocks, and control flow arcs are frequency equivalent if they are executed or traversed the same number of times in any execution of the program. Instructions in the same basic block are always frequency equivalent because whenever one instruction is executed, by definition, so are all the other instructions. Instructions in different basic blocks are frequency equivalent if the corresponding basic blocks are frequency equivalent.

Thus, sub-step 500 aims to identify frequency equivalent basic blocks and control flow arcs. This is achieved by analyzing the control flow graph 203 to identify nodes which represent basic blocks and arcs that are cycle equivalent, a property that is closely related to frequency equivalence.

By definition, a set of nodes and arcs in a graph are cycle equivalent if every cycle, i.e., closed path, in that graph contains either all of them or none of them. A method to identify cycle equivalent nodes and arcs is described by Johnson et al., *The Program Structure Tree: Computing Control Regions in Linear Time,* Proceedings of ACM SIGPLAN '94 Conference on Programming Language Design and Implementation, pp. 171–185, 1994. Cycle equivalence in a graph, however, does not imply frequency equivalence. The discussion below explains how to determine frequency equivalence by augmenting a control flow graph, and dividing the graph into sub-graphs. Then, the cycle equivalence for each sub-graph can be determined.

Entry and Exit Nodes

As shown in FIG. 5b, the control flow graph 514 for a procedure contains two special nodes, called the entry node 512 and the exit node 513. These nodes represent the points at which control enters and leaves the procedure 514. The Johnson et al. method applies only to control flow graphs where there is a path from the entry node to every other node of the procedure, and there is also a path from every other node to the exit node of the procedure. The present invention improves that method so that it can be applied to more general control flow graphs that do not necessarily have those limitations.

Augmented Flow Graph

In step 510 in FIG. 5a, the control flow graph is augmented with an arc 515 from the exit node to the entry node. Step 511 in FIG. 5b illustrates this transformation for nodes 512–513 and arc 515. In step 520, the augmented control flow graph is decomposed into strongly connected sub-graphs using known methods, for example, see Tarjan, *Depth—first search and linear graph algorithms,* SLAM Journal on Computing, 1(2):146–160, 1972.

By definition, a strongly connected component of a graph is a maximal sub-graph in which there is a path from every node to every other node. Step 521 of FIG. 5b illustrates this decomposition, with the three resulting strongly connected sub-graphs enclosed by dashed boxes 522–524.

For the purpose of the following discussion, a "dead-end" sub-graph or component 524 is defined as a strongly connected component with no arcs from its nodes to any other node of the graph.

In step 530, all arcs entering dead-ends are redirected to the exit node. This is illustrated by step 531 of FIG. 5b with the redirection of arc 542. In step 540, the method for computing cycle equivalence developed by Johnson et al. applied to each dead-end component 524. For each dead-end component 524, the method produces the cycle equivalence classes of the nodes and arcs in the dead-end component 524.

In step 550, the method is applied to the remainder of the graph, leading to cycle equivalence classes for the remainder. These two steps are illustrated in step 541 of FIG. 5b. The cycle equivalence classes produced in these last two steps together constitute the frequency equivalence classes of the original graph.

Estimating Frequency and Cycles-Per-Instruction (cpi)

The following sections give more details on methods for estimating execution frequencies and cycles-per instruction (cpi) for each instruction of a program, and methods for deducing, based on these values, reasons for pipeline stalls. These methods (A–D) will be described in the following order.

A. A method for identifying performance bottlenecks or problems, i.e., pipeline stalls, at the level of individual instructions of programs.

B. A method for estimating the execution frequencies of individual instructions of a program C. A method for deducing possible causes for dynamic stalls.

D. A method (and apparatus) for measuring the execution frequencies of individual instructions in a program using performance counters according to the invention.

It should be noted that with these methods, the sample counts based on a periodic sampling are only proportional to the total time each instruction spends at the head of the issue queue. Periodic sampling does not directly provide information about execution frequencies. Execution frequencies can be estimated from the sample counts as described for method B, or can be measured directly using method D.

Method A For Identifying Performance Problems

Figure 6:
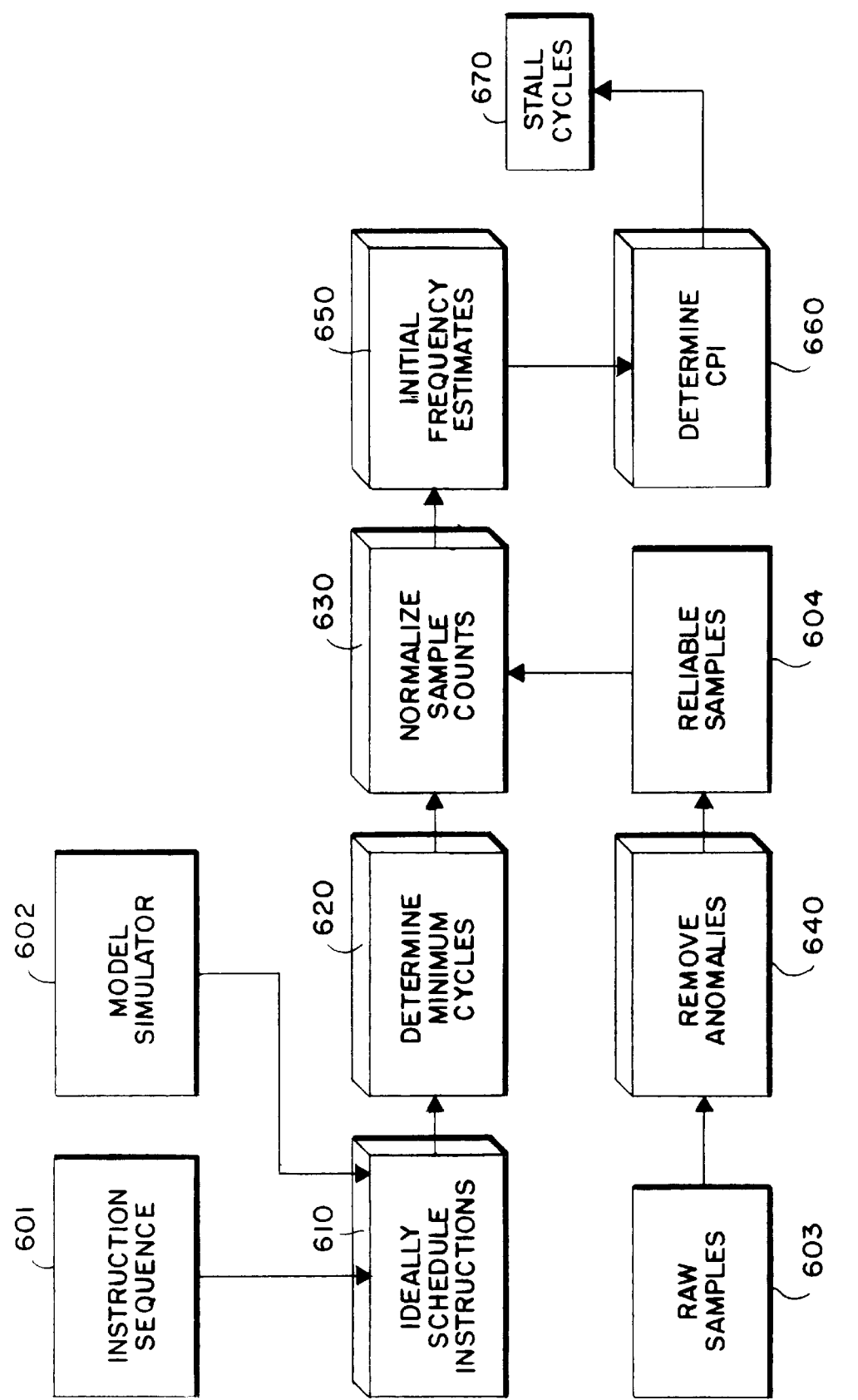
FIG. 6 is a block diagram of a process for determining initial frequency estimates and stall cycles.

As shown in FIG. 6, necessary input data for method A (600) include:

1. a program being analyzed;

2. sample counts for each instruction, where the count is proportional to the time spent at the head of the issue queue when the issued instruction is retired without replay i.e., don't count issues for replays, that are instructions reissued due to processing exception condition; and 3. a model or simulator for the system to be analyzed.

First, raw sample counts 603 are collected for instructions as the program 601 is executing, see also step 310 of FIG. 3. This means sample counts are determined for instructions having different PC values. The sample count is proportional to the time (number of cycles) the instruction spent at the head of the issue queue for an in-order processor. It should be understood, that any performance counter sampling technique can be used here. Anomalies in the raw samples can be removed (normalization) in step 640 to produce reliable samples 604. Anomalies may be due to multi-issued instructions, or instructions with delayed execution where stalling cycles may overlap with subsequent issued instructions.

Second, a model of the system or a system simulator (602) can be used to ideally schedule (610) the instructions of the program on the assumption that there are no dynamic stalls. This step identifies all static stalls, and their causes. From the ideal schedule, it is possible in step 620 to identify the minimum (ideal) number of cycles required to issue each instruction.

Third, using the minimum cycle counts and normalized sample counts 630, the execution frequency of each instruction can be estimated step 650. The execution frequency is the number of times the instruction was "retired." Retired means the instruction completed execution. This can be done in at least three ways.

1) For any program, this can be done using method B below, which relies solely on the sample counts from the first step above.

2) For deterministic application programs, frequencies can also be determined using conventional profiling technology that counts basic block executions. There, the program is executed using a conventional profiler to acquire execution frequencies. In this case, the program must be re-executed with the identical input data in order to obtain comparable sample counts.

3) For any program, this can also be done using method D, which relies on enhanced hardware performance counters to sample the rate at which instructions are retired.

Fourth, determine the cycles-per-instruction (cpi) of each instruction in step 660, i.e., the average number of cycles required to issue each instruction. This value can be computed by dividing the sample count for a given instruction by its execution frequency, see also step 330 FIG. 3.

Fifth, use method C to identify the number of dynamic stall cycles for each instruction, and the possible causes for each stall in step 670. The number of dynamic stall cycles can be determined by subtracting the minimum (ideal) number of cycles (the second step of method A above) from the cpi. Once this is known, the possible causes for the dynamic stalls can be postulated.

Method B for Estimating Execution Frequencies
Input and Output Data

Figure 7A:
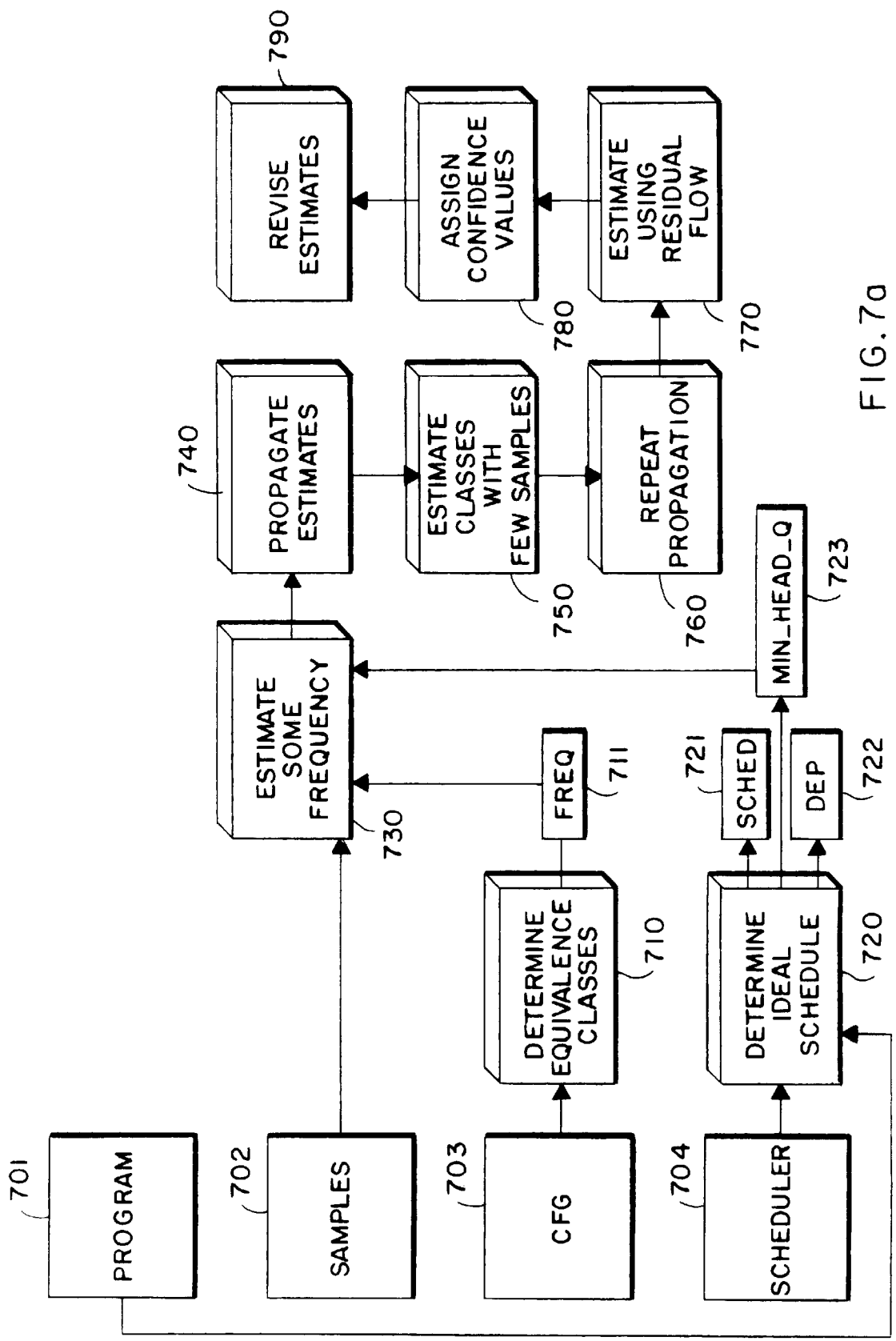
FIG. 7a is a block diagram of a process for locally propagating frequency estimates.

As shown in FIG. 7a, necessary input data for method B (700) include:

1. a program 701;

2. sample counts 702;

3. a control flow graph (CFG) 703 of the program; and 4. an instruction scheduler or model 704 for the processor on which the program was run while gathering samples.

In the CFG as described above, each node represents a basic block, and a basic block is a sequence of instructions that are necessarily executed the same number of times. Each arc in the graph represents a possible execution flow from one block to another. This method works even if the CFG is missing some arcs so long as the CFG is marked as possibly missing arcs. An arc may be missing because, for example, the method for constructing the CFG from source, object, or executable code is imprecise.

The instruction scheduler 704 can take as input an array of instructions (INSTRUCTION), and return as output an ideal schedule (SCHED) for the instructions. SCHED can be in the form of an array of integers. In the array, an array element SCHED(I) is the number of cycles required to issue the it instruction (INSTRUCTION(I)) under the ideal case where the number of cycles for static stalls are precisely known, and no dynamic stalls are presumed to occur.

In addition, the instruction scheduler must identify static dependencies between instructions. INSTRUCTION(I) has a static dependency on INSTRUCTION(j) if j<I and INSTRUCTION I could not be scheduled earlier than INSTRUCTION(j) because it always needs processor resources used by INSTRUCTION(j), or a value computed by that instruction.

In order to identify static dependencies, the instruction scheduler might return, in addition to the array SCHED, an array DEP. In array DEP, an array element DEP(I) has either a value j when INSTRUCTION(I) has a dependency on INSTRUCTION(j), or a value of zero when INSTRUCTION(I) has no dependency. If INSTRUCTION (I) has static dependencies on several preceding instructions, DEEP(I) should be set to the value representing the preceding instruction closest to INSTRUCTION(I).

The method produces as output data the following pairs of values. For each block and arc in the CFG 703, frequency estimates are in the form (FREQUENCY, CONFIDENCE), where FREQUENCY, a non-negative number, is the frequency estimate, and where CONFIDENCE is a value indicating how accurate the estimate FREQUENCY is expected to be.

The frequency estimates are in the units of the sampling period used to obtain the samples. For example, if the sampling period is 1 sample per 65,536 cycles, a basic block which has a frequency estimate of 100 was executed an estimated 6,553,600 times.

Overview of Method B

The sample counts are used to deduce estimates for portions of the CFG. The estimates are based on ideal instruction scheduling to identify the minimum number of cycles that a short sequence of instructions, often just a single instruction, must spend at the head of the issue queue for each "successful execution," i.e., the instruction was successfully retired.

First identify short sequences of instructions that probably incur no dynamic stalls. Some basic blocks in the CFG may have no such sequences.

Next, estimate the execution frequency of a sequence of instructions without dynamic stalls as the sum of their sample counts divided by the minimum number of cycles the instructions spend at the head of the issue queue (per "successful execution"). For some sequences that could incur dynamic stalls, use another heuristic described below to estimate their frequencies.

Flow constraints of the CFG can be used to propagate the estimates to the blocks and arcs which can not be directly estimated. First, local propagation and other cruder heuristics can be used to make estimates for most remaining portions of the CFG. Next, assign a confidence value to each estimate to indicate the accuracy of the estimate. Finally, use a constraint solver based on Gaussian Elimination and modified Gram-Schmidt method to find a solution to the flow constraints "closest" to the initial estimates.

Typically, the initial estimates violate the flow constraints. Here, the Gram-Schmidt method is modified to make use of the confidence values: solutions that affect high-confidence estimates to a lesser degree are deemed "closer" than solutions that affect low-confidence estimates. Correct any estimates in the solution that are unreasonably high or low, for example, solutions which yield a negative confidence value.

Detailed Description of Method B

For each procedure in the CFG perform the following steps.

Step 1. Determine the frequency equivalence values.

Unless the CFG 703 is missing arcs, use the frequency equivalence algorithm to partition the blocks and arcs of the CFG into sets whose members have the same "execution frequency." These sets are called "frequency equivalence classes" (FREQ) 711, or "classes" for short.

If the CFG 703 is missing arcs, then create a frequency equivalence class for each block and for each arc.

Note, each block or arc will be in exactly one frequency equivalence class. Note also that each instructions in the basic blocks of a frequency equivalence class must be executed the same number of times. By definition, if B is a basic block in frequency equivalence class C, then every instruction in block B has a frequency equivalence class of C.

Step 2. Determine ideal schedules and the value min_head_q.

For each basic block, use the model instruction scheduler to determine both the array SCHED 721, an ideal schedule without any dynamic stalls for the sequence of instructions in the block, and the array DEP 722, the static dependency information for the instructions. Also, determine an array of values "min-head_q" 713 for each instruction of the block. SCHED gives, for each instruction in the block, the number of cycles required to issue the instruction, as long as no dynamic stalls occur, based on the assumption that the first instruction immediately issues. DEP gives, for each instruction in the block, the number of the closest preceding instruction on which it depends. The values min_head_q are indicative of the minimum (ideal) number of cycles that instructions spend at the head of the issue queue.

For blocks with multiple predecessors, the input to the instruction scheduler is simply the sequence of instructions in the block.

If block B has a unique series of predecessor blocks, for example, P1, P2, . . . , Pn such that P1 is the only predecessor of B, P2 is the only predecessor of P1, . . . , and Pn-1 is the only predecessor of Pn, then the input to the instruction scheduler should be a concatenation of the instructions of the blocks in the execution order of the blocks, i.e., Pn, Pn-1, . . . , P2, P1, and then B. The purpose of using the instructions of the preceding blocks is to obtain a more accurate schedule for the instructions by giving the instruction scheduler more information about the context in which a particular block is executed.

Let, OFFSET be the total number of instructions in blocks P1 to Pn. (OFFSET is 0 if the block has multiple predecessors.) Then, for each instruction I, compute the number of cycles the instruction is expected to be at the head of the issue queue under the ideal instruction scheduling. For all instructions, other than the first instruction in a basic block with multiple predecessors, set:

min_head_q[i]=sched[i+offset]−sched[i+offset−1]

For the first instruction in a basic block, i.e., I=0, with multiple predecessors, i.e., offset=0, use the estimate min_head_q[0]=1.

Note, when multiple consecutive instructions are issued in the same cycle, only the first instruction has a non-zero value in the min_head_q array. This makes sense because in a group of multi-issued instructions, only the first one appears at the head of the issue queue. This first instruction is called an "issue point." The performance counters can only collect performance data for instructions which are issue points. Because performance data for other concurrently issued instructions deeper in the issue queue are not available, these performance data, e.g., execution frequency must be deduced as described below.

Step 3. Estimate frequencies for some blocks

The basic strategy for estimating frequencies relies on the general observation that, if an instruction I issues without dynamic stalls, then its frequency is, ignoring errors in sampling and other problems noted below:

$$\text{frequency}[i]=\text{samples}[i]/\text{min\_head\_q}[i] \quad \text{Eq.1}$$

where samples [i] is the sample count for instruction I. If min_head_q[i] is 0, then the frequency for instruction I cannot directly be determined using this equation.

If an instruction incurs dynamic stalls, then the ratio:

samples [i]/min_head_q[i]

can only become larger than the frequency because samples [i] increases while min_head_q[i] remains constant. The heuristic used by the preferred embodiment for estimating frequencies exploits both of these observations.

Given a sufficiently large number of instructions in a particular frequency equivalence class C, it is reasonable to assume that some of the instructions have no dynamic stalls. Thus, one can estimate the execution frequency of the instructions in class C by averaging some of the smallest ratios in the set:

{samples [i]/min_head_q[i]} such that the INSTRUCTION I is in the class C and I is an issue point, i.e., min_head_q[i]>0).

There are some situations where Eq 1 leads to frequency values that are too low. First, when a basic block B has multiple predecessors in the CFG, the min_head_q array determined in Step 2 above may be inaccurate. For example, when control enters a block B from predecessor block P1, the first instruction in B might be dual-issued with the last instruction of P1. In this case, min_head q[0] for block B should be 0, however in Step 2 it is set to 1.

Another situation where Eq 1 leads to frequency values that are too low occurs when an instruction has a "long dependency." INSTRUCTION I has a dependency on some preceding INSTRUCTION j when the reason INSTRUCTION I could not be issued earlier according to the ideal schedule is because INSTRUCTION I needs a resource used by INSTRUCTION j. A dependency of INSTRUCTION I on INSTRUCTION j is a "long dependency" if I>j+1, namely, when there are additional instructions between the INSTRUCTION j and I.

A problem arises when an instruction between INSTRUCTION j and I incurs a dynamic stall, i.e., the intervening instruction spends more time than expected at the head of the issue queue. As a result, instruction I will spend less time than expected at the head of the issue queue so samples [i] will be smaller than expected and Eq 1 yields an inaccurate value.

There are at least two remedies to this problem. One is to ignore instructions that have long dependencies when estimating frequencies. An alternative remedy is to replace the ratio:

samples[i]/min_head_q[i]

with (sum of samples[j+1 . . . I])/(sum of min_head_q[j+1 . . . I]) for any instruction I that has a long dependency on instruction j.

Many of the low-level details of the estimating method involve how to select the ratios that should be averaged. At a high level, some of the key points embodied below include:

If an equivalence class C includes instructions at issue points, and the instructions should never incur dynamic stalls as determined by an analysis such as used in method C below, it is best to use the ratios determined for those issue points. Sub-step 3.c and 3.f below.

For a given processor configuration, there typically is an upper bound on the length of time of stalls. This upper bound can be translated into a lower bound on the frequency, see sub-step 3.d below.

If there are no sampling errors, multiple issue points that occur no or few stall cycles would have nearly the same ratios. Sampling errors introduce some variance in the ratios, but the largest ratio is probably no more than 1.5 times the smallest ratio, see sub-step 3.g below.

If a class has a large number of issue points, some minimum fraction of the issue points should issue without dynamic stalls. Thus, some minimum number of ratios should be averaged to compute the estimate. Together with the previous issue point, this issue point can be used to discard ratios that are unreasonably low or high because of some anomaly in the samples or analysis, see sub-step 3.g.

Detailed Description of Step 3

Figure 8:
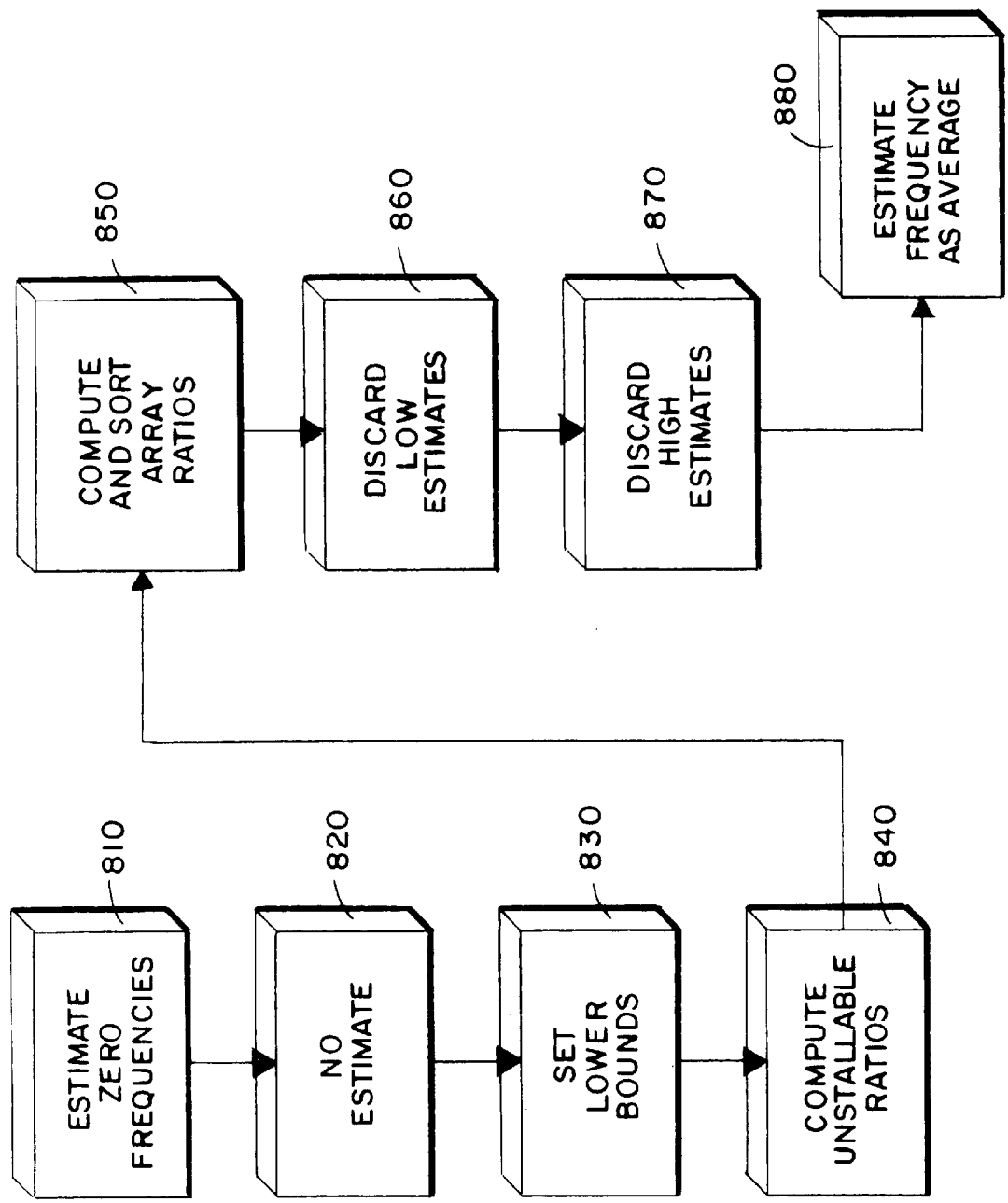
FIG. 8 is a block diagram of a process for globally propagating frequency estimates.

For each frequency equivalence class C that contains at least one instruction perform the following sub-steps 3a to 3h as shown in FIG. 8.

a. When class C contains at least one issue point and all instructions in the equivalence class C have a sample count of 0, then estimate the frequency of C as 0, step 810. Otherwise, proceed to sub-step 3.b.

b. When the total sample counts for the instructions in class C is less than some threshold, for example, four times the total number of issue points in C, then make no estimate for class C, step 820.

c. Set freq_lower_bound, the lower bound for the estimate, to be the maximum sample count of instructions in class C divided by the maximum stall cycles possible for the particular hardware that ran the program, step 830. E.g., on a specific processor implementation it may be that stalls are never longer than 256 cycles. If freq_lower_bound is less than one, set it to one. Freq_lower_bound will be used to discard ratios that are unreasonably low, e.g., because of an anomaly in the sampled performance data.

d. An instruction is unstallable when it is possible to eliminate all common causes for dynamic stalls, e.g., by using the technique of Method C. Compute the following ratios into an array UnstallableRatios (RATIOS), step 840:

For each issue point in class C with DEP(I)=0, and where I is unstallable:
samples[i]/min_head_q[i].

For each issue point in C with DEP(I) not zero, and where DEP(I)+1 through I are unstallable:

(sum of samples [DEP(I)+1 ... I])/(sum of min_head_q[dep[i]+1 ... I]).

If the array RATIOS is not empty, then estimate the frequency of class C as the average of the ratios in the array RATIOS, provided that the average is at least as big as freq_lower_bound. Otherwise, proceed with sub-step 3.e.

e. For each issue point in the members of class C with DEP(I)=0:

samples[i]/min_head_q[i].

For each issue point in class C with DEP(I) not zero:

(sum of samples [DEP(I)+1 ... I])/(sum of min_head_q[DEP(I)+1 ... I])

f. Discard any elements in RATIOS less than freq_lower_bound (step 860). If there are no other elements, make no estimate for class C.

g. Discard any elements in RATIOS greater than freq_upper_bound, step 870.

In the preferred implementation, freq_upper_bound is determined as follows: Let x be the smallest element in RATIOS. If x<15 then:

freq_upper_bound=MIN(20, 2*x)

else freq_upper_bound=1.5*x.

The goal here is to identify a reasonably large subset of the frequencies for the issue points in class C as likely candidates for averaging to estimate the execution frequency for class C. If the length of the array RATIOS is less than or equal to one eighth of the number of issue points in class C, then it is likely that the frequency values in the array RATIOS are anomalously low due to sampling error or other problems. Look at larger values by setting freq_lower_bound to sqrt(2)*x, and going back to sub-step 3.e. However, if this is the third time sub-step 3.g is performed for class C, make no estimate for class C.

h. Estimate the frequency as the average of the N smallest ratios in step 880. At a high level, the problem being solved is selecting N, the number of the smallest ratios to include in the average. There is a tension between making N small and making N large. If N is small, it increases the chances of averaging only the ratios of issue points that have low sample counts—either because of statistical sampling error or some anomaly. If N is large, it increases the chances of including the ratios of issue points where there were dynamic stalls, which would make the estimate too large.

For example, one implementation might select N as:

N=MIN(length(RATIOS),
   MAX(3,
     number of issue points/4,
     number of ratios that are at most 1.1 times the smallest ratio))

Step 4. Perform local propagation of estimates.

At this point, only some of the frequency equivalence classes have frequency estimates. Local propagation exploits "flow in=flow out" constraints to determine frequency estimates for additional classes from the existing estimates, step 740. The constraints exploit the fact that the total number of times an execution flow enters an equivalence class must equal the total number of times the execution flow leaves the class.

For example, consider a CFG fragment with a basic block B with one input arc, and three output arcs; suppose the frequency of the input arc is 200, and frequencies of the three output arcs, from left-to-right, are unknown, 25 and 100.

The constraint "flow in=flow out" can be used to determine the frequency of fragment B as 200. Next, the frequency of the leftmost exiting arc can be computed as 75, i.e., (200−(25+100)).

A single propagation is possible whenever there is a block with multiple (N) incoming arcs, that is N is greater than zero, 0, and there are estimates for the frequencies of all but one of the classes of the N arcs and the class of the block. The propagation is done by solving the equation:

$$\text{freq}(\text{class}(\text{block})) = \text{sum}[i=1, N] \text{ of freq}(\text{class}(\text{incoming arc } I)) \quad \text{Eq. 2,}$$

for the single unknown frequency. If the solution for the unknown frequency is negative, do not use the solution.

Similarly, a single propagation is possible when there is a block with N outgoing arcs, that is, N is greater than zero, and there are estimates for the frequencies of all but one of the classes of the N arcs and the class of the block. The propagation is performed by solving the equation:

$$\text{freq}(\text{class}(\text{block})) = \text{sum}[i=1, N] \text{ of freq}(\text{class}(\text{outgoing arc } I)) \quad \text{Eq. 3.}$$

for the single unknown frequency. If the solution for the unknown frequency is negative, do not use the solution.

Note that the constraint N>0 handles the entry and exit blocks of the CFG 703 for Eq 2 and Eq 3.

To perform local propagation, simply perform single propagations until no single propagation is further possible, other than those that would introduce negative frequencies.

Step 5. Make estimates for classes with few samples.

At this point, there are still some classes without estimates because they contain few samples or issue points. Step 5 (750) makes a crude estimate for such classes.

For any class C that contains at least one issue point but lacks a frequency estimate, estimate the frequency of class C:

sum of the samples of instructions in class C, divided by MAX(1, sum of the min_head_q arrays for C)

Step 6. Repeat local propagation.

In step 760, local propagation is repeated with the additional estimates.

Step 7. Make estimates using residual flow.

At this point, some arcs may still be in classes without estimates. Consider a CFG fragment B with a single basic block B with one incoming arc of frequency 200, two outgoing arcs of unknown frequencies, and one outgoing arc with a known frequency of 100.

Local propagation is impossible here because there is more than one exiting arc without an estimate. A crude estimate for the exiting arcs is to divide the residual flow (200−100) by the number of exiting arcs without estimates.

Step 770 makes such estimates by considering all of the arcs in a class without an estimate. It does this by examining both endpoints of each arc. Furthermore, it ignores the endpoints when the residual flow is negative, which is possible because the estimates may be inaccurate.

Define sibling_arcs(arc A, block B), where arc A is connected to block B, as the set of arcs A' (other than A) connected to the same side of block B as arc A is connected to. E.g., if arc A enters block B, then sibling_arcs(A,B) is the set of arcs other than A entering block B.

Then, the residual flow of a block B to the arc A connected to block B is:

freq(class(B))−sum freq(class(A'))
   for arcs A' that are in sibling_arcs(A,B) and that have a frequency estimate freq(class(A')), divided by:
(the number of arcs in sibling_arcs(A,B)
that do not have frequency estimates+1).

For each class C without an estimate and containing at least one arc, first make the following initial assignments.
N:=0; and
flow:=0

Then for each arc A in class C, and for each endpoint B of A, i.e., B is in A's source or target block, if there is an estimate freq(class(b)) and residual_flow(b, A)>=0, then:
flow:=flow+residual_flow(B,A), and
N:=N+1.

Finally, if N>0, then estimate C's frequency as (flow/N).

Step 8. Assign confidence values to estimates.

Some of the estimates are likely to be more accurate than others. For example, most estimates made in sub-step 3 are probably more accurate than the estimates made by local propagation, which can accumulate errors, or the estimates made by step 5, which makes crude estimates for blocks with few samples or few issue points, or the estimates made by step 7, which makes crude estimates for arcs using residual flow.

Furthermore, for the estimates made by step 3, accuracy correlates with:

1) having many issue points contribute in the average, sub-step 3.h, and
2) having low variance in the ratios of the issue points that contribute to the average.

Thus, one can establish the accuracy of an estimate by assigning it a "confidence value" in step 780. The preferred implementation has three confidence values: low, medium, and high confidence.

High confidence estimates are:
a) estimates made in step 3.a for classes with at least two issue points in the same basic block;
b) estimates made in step 3.d; and
c) estimates>=100 made in step 3.h by averaging at least three ratios (N>=3), where the largest ratio was <=1.2 times the smallest ratio.

However, if step 3.g was done more than once for an estimate, the estimate has low confidence.

Medium confidence estimates are:
a) estimates made in step 3.a for classes with 2 issue points;
b) estimates>=100 made in step 3. However, if step 3.g was done more than once for an estimate, the estimate has low confidence; and
c) estimates>=100 made in step 4 (local propagation) for complete CFS (i.e., no missing arcs). However, if step 3.g was done more than once for any estimate used in a "flow in=flow out" equation, the estimate has low confidence.

Low confidence estimates are:
The remaining estimates.

Step 9. Use a (global) constraint solver.

At this point, there are estimates and confidence values for most of the frequency equivalence classes. However, the estimates may violate the flow constraints. Step 790 of FIG. 7 uses a constraint solver to revise the estimates to satisfy the constraints, unless an estimate would exceed reasonable bounds, e.g., no negative estimates are allowed.

The key properties of the constraint solver are:
(1) The solver must handle underconstrained systems of linear equations: These can be expressed as Ax=b, where A is a matrix of constraints and x and b are vectors.

(2) Given a vector x of initial estimates for the variables and a vector w of weights for the variables, the solver finds a solution vector x' that minimizes the weighted magnitude of the vector x-x'. The weighted magnitude of the vector v for a weight vector w is:

sqrt (sum[i=1, n] $(w(I)*(v(I)^2))$

Figure 7B:
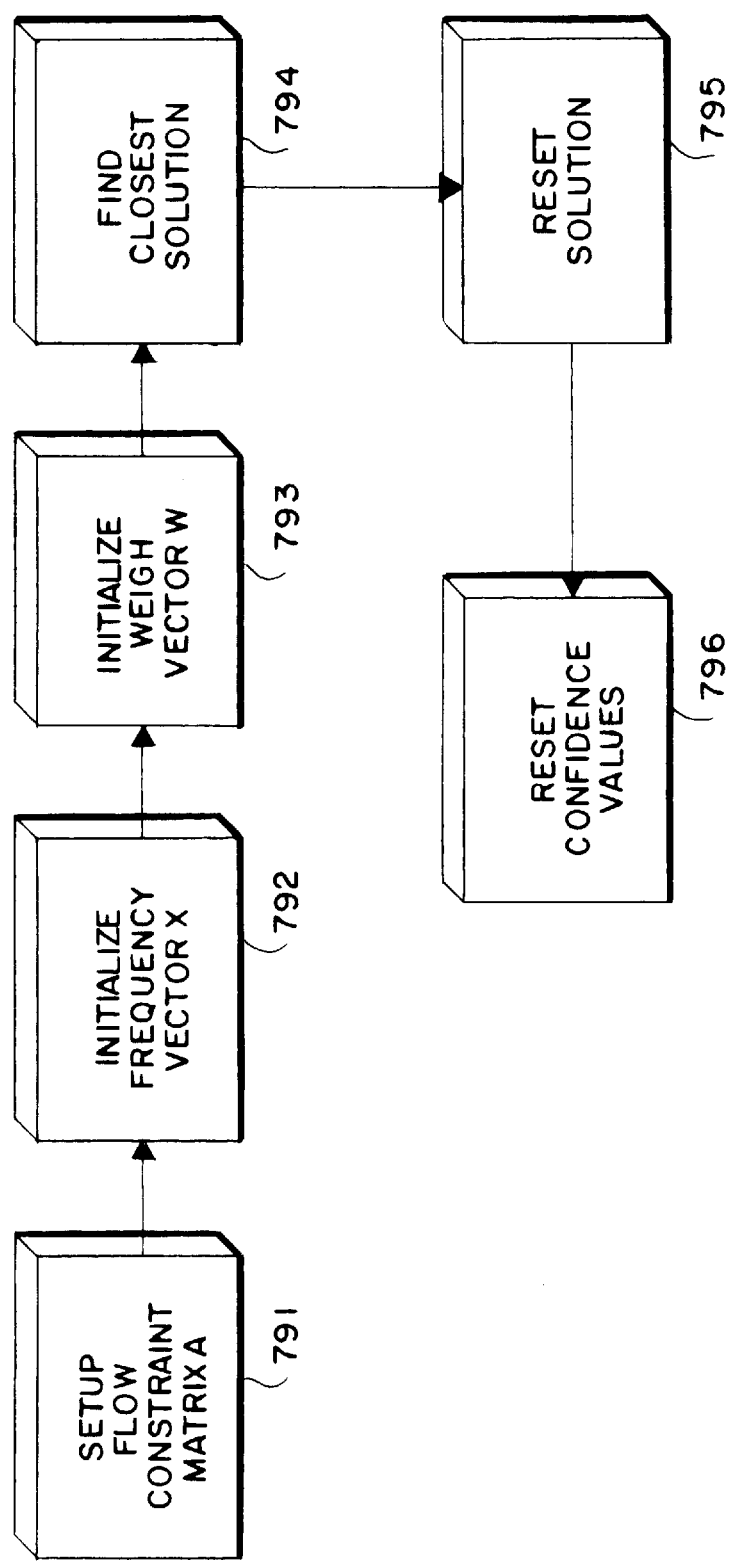
FIG. 7b is a block diagram of a constraint solver.

It is straightforward to build such a solver using standard linear algebra techniques such as Gaussian Elimination and Gram-Schmidt orthonormalization, as shown in FIG. 7b.

a). Set up a matrix A with the flow constraints, step 791. Use one column in the matrix A for each frequency equivalence class that has an estimate. Use one row for each flow constraint. The flow constraints are obtained by applying Eq 2 and Eq 3 of step 4 to the blocks in the CFG. However, a flow constraint is discarded when it refers to a frequency equivalence class that has no estimate, or the flow constraint produces a row of all zeros, which happens when all of the variables in Eq 2 or Eq 3 are in the same frequency equivalence class.

Because the flow constraints are insufficient for determining a unique set of frequency values, the matrix A will be an underconstrained system of linear equations.

b). Initialize a vector x with the frequency estimates in step 792; x[i] is the estimate for the it frequency equivalence class.

c.) Initialize a vector of weights w[i] for frequency class I to be equal to the number of blocks and arcs in the frequency class I times the confidence_weight of estimate x[i]. all divided by one if x[i]=0, and else by x[i], where x and w are equal in length, step 793.

These weights are used in the next step to control the relative change in estimates that violate the flow constraints. For example, if the constraint matrix A indicates that only two estimates should be equal, estimate x[1] would be increased by the amount:

(w[1]/(w[1]+w[2])) times (x[2]−x[1]).

The weight of higher-confidence estimates should be larger than those of lower-confidence estimates. A preferred implementation sets the variable confidence_weight to:

1 for low-confidence estimates;
100 for medium confidence estimates; and
10000 for high confidence estimates.

The weights of estimates should also be inversely proportional to their magnitudes. Thus, conflicting estimates with the same confidence value are each adjusted by the same percentage. For example, consider the flow graph which has a basic block with frequencies on two incoming arcs to be 10 and 1, and on the outgoing arc 10, and where each estimate has the identical confidence. If the weights were all equal, the constraint solver would respectively assign the values 9.67, 0.67, and 10.34. In this solution, the estimate for the right arc has changed by 33%.

When the weights are normalized, the solution respectively yields 9.52, 0.95, and 10.47. Here, each of the estimates has changed by roughly 5% of its original value.

d). Use a constraint solver to find the solution closest, with respect to the weighting, to the original estimates, step 794.

e). Reset any solution below its lower bound to its lower bound, step 795. The lower bound of an estimate is freq_lower_bound at step 3.g, or 0 if the estimate was not made in step 3.

f). Reset the confidence value for any estimate that has changed from its original value by more than 10% to "low confidence," step 796.

Method C: Explaining Stall Cycles

The following description of method C should be read with reference to FIGS. 9–12.

Overall Approach

After the average number of stall cycles has been determined for each instruction, the next step is to deduce possible explanations for the stalls. This helps system designers to understand the causes of performance problems and to devise appropriate solutions.

Performance counters can be used to sample the occurrences of events that can cause dynamic stalls, such as data-cache misses. However, on most systems, such performance counters do not accurately identify which instruction caused a given event. Method C uses the execution frequency and cycles-per-instruction information computed in Method B, together with the control-flow graph for a procedure, to determine reasons for each dynamic stall.

Figure 9:
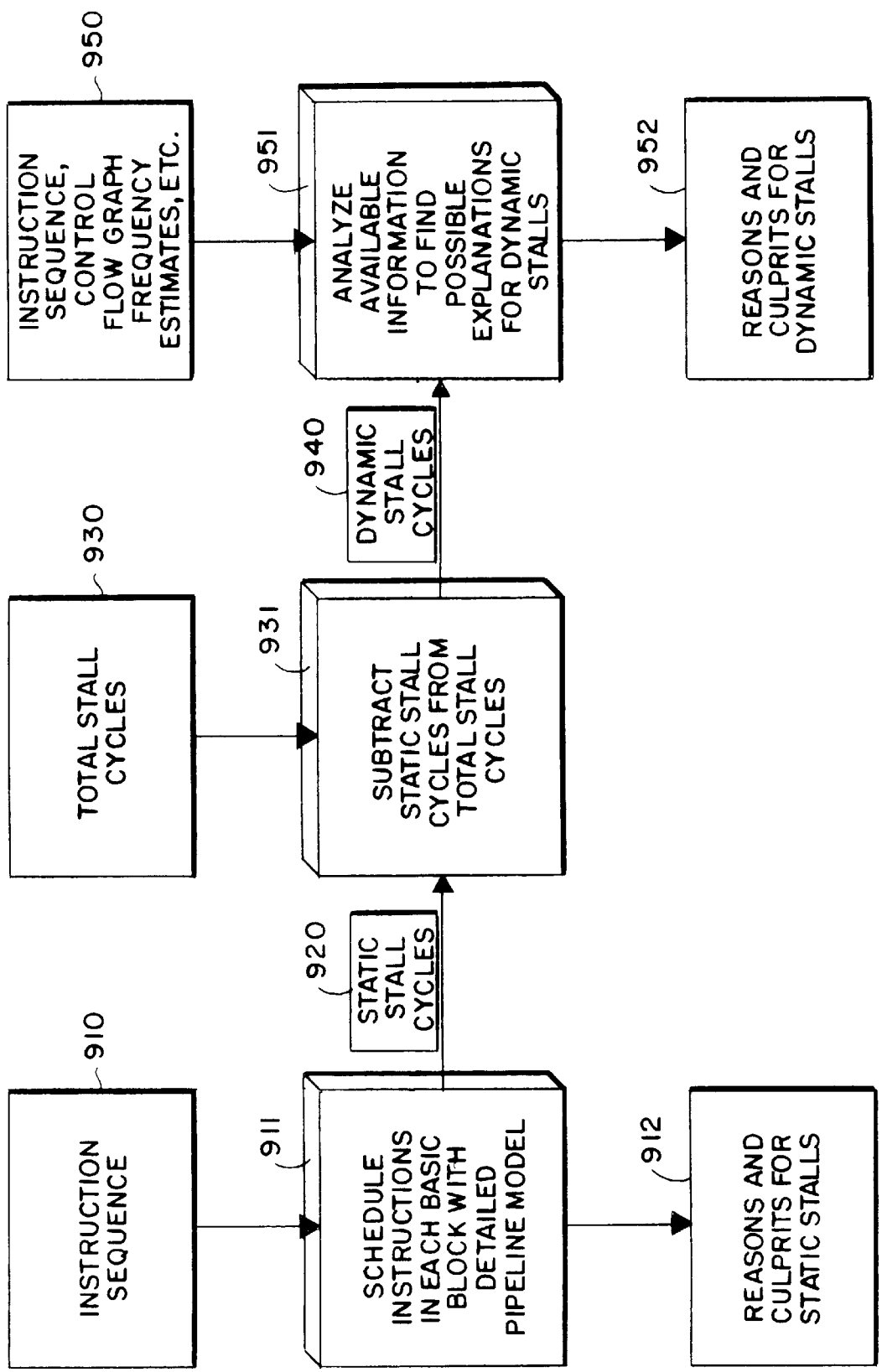
FIG. 9 is a flow diagram for determining reasons for dynamic stalls.

FIG. 9 shows an overall approach to find possible explanations for stall cycles. In step 911, instructions in each basic block are scheduled using a detailed model of the processor pipeline. A record of the pipeline's operation yields the number of cycles each instruction is stalled (920), the reason why the instruction is stalled, and, if appropriate, the prior instruction(s), called "culprits" hereinafter, causing this stall to occur (912). For example, the stalled instruction may need the result computed by the culprit instruction(s).

In step 931, the known static stall cycles (920) are subtracted from the total stall cycles (930), determined as described earlier, to produce the dynamic stall cycles for every instruction (940). Dynamic stall cycles are stall cycles that cannot be explained by constraints imposed by the processor pipeline.

In step 951, possible explanations for dynamic stall cycles are identified by analyzing all available information (950), including but not limited to the instruction sequence and the properties of individual instructions, the control flow graph, and the frequency estimates obtained as described earlier. This analysis yields possible reasons and, if appropriate, culprits for the dynamic stalls (collectively 952).

To find possible explanations for dynamic stalls suffered by a specific instruction (step 951), all known reasons that could cause instructions to stall in general are considered. Some of these reasons may be ruled out (or eliminated) in the specific case. Details of this elimination process are described below.

In addition to the analysis techniques described below, hardware performance counters that count various kinds of events can also be used to identify the reasons for dynamic stalls. Samples can be obtained for events, such as I-cache misses, that identify the frequency of those events for each instruction.

This information can be used to determine the contribution of each possible reason to the dynamic stalls observed for the instruction. The samples for a given event must provide, for each instruction, an approximate count of the number of times the event occurred for that instruction. For certain kinds of events, this may require hardware support of the form discussed below in Method D.

Generally, reasons that cannot be ruled out are offered as possible explanations for the specific stall. The elimination does not always produce a unique explanation for each dynamic stall, however, it is often able to do so. In fact, an instruction could indeed be stalled for multiple reasons simultaneously or at different times.

Even if a unique reason can not be given, giving all possible reasons helps users to narrow down the possibilities. The following paragraphs describe how some common causes of dynamic stalls can be ruled out under the appropriate conditions.

Ruling out I-cache or ITB miss

A dynamic stall may occur when an instruction cache (I-cache) is accessed to fetch an instruction but the required instruction is not in the I-cache. This is called an I-cache miss. In this case, the instruction has to be fetched from memory which may have long latencies.

Similarly, a dynamic stall may occur when the instruction translation look-aside buffer (ITB) is accessed to translate a virtual memory address for an instruction into a physical memory address, but the required translation entry is not in the ITB (called an ITB miss). In this case, the ITB has to be updated with the required entry before the instruction fetch can continue. An I-cache or ITB miss may be ruled out if certain conditions are satisfied by the addresses of the instruction being fetched and the one executed immediately before the stalled instruction.

Figure 10:
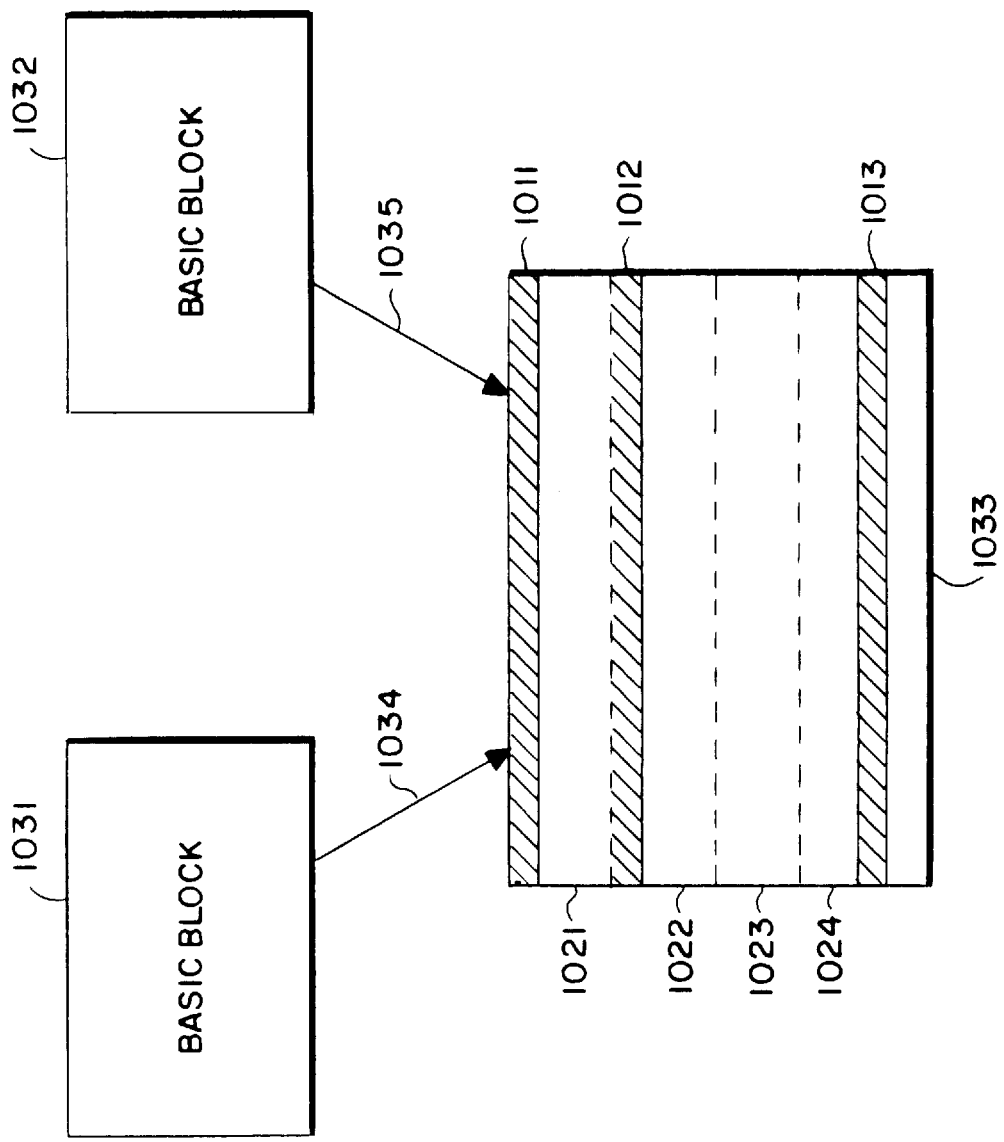
FIG. 10 is a block diagram of cache misses for basic blocks.

FIG. 10 illustrates the cases to consider for I-cache misses. (ITB misses are discussed later.) The figure shows three basic blocks 1031, 1032, 1033. Blocks 1031 and 1032 call block 1033, arcs 1034–1035 may flow between them as represented in the control flow graph. The figure also shows how instructions 1011–13 are mapped to lines 1021–1024 of block 10 and how the instructions of basic block 1033 are laid out in memory. In FIG. 10 the instructions 1011–1013 are shown hashed, and the separation between the lines are shown as dashed lines.

Several cases are considered, as illustrated by the instructions 1011, 1012, 1013. If a stalled instruction is NOT at the beginning of a basic block, there are two sub-cases. If that instruction, e.g., 1012, is at the beginning of a cache line (in other words, the instruction's address is a whole multiple of the cache line size), then an I-cache miss CANNOT be ruled out because the instruction executed immediately before it is in another cache line. If the stalled instruction (e.g., 1013) is NOT at the beginning of a cache line, an I-cache miss can be ruled out.

Finally, if an instruction, e.g., 1011, is at the beginning of a basic block, regardless of whether it is also at the beginning of a cache line, then the last instructions in all the basic blocks, e.g., 1031, 1032, called predecessor blocks hereinafter, from which control may flow to the basic block containing the stalled instruction, e.g., 1033, are examined. If these instructions are all in the same cache line as the stalled instruction, e.g., 1011, an I-cache miss can be ruled out. Instructions are in the same cache line if their addresses produce the same quotient when divided by the cache line size. This analysis may ignore predecessor blocks which are executed much less often than the basic block containing the stalled instruction, according to the frequency estimates obtained earlier.

If this analysis is applied to a processor or computer system that has only a single cache for both data and instruction, then one additional check should be done. An I-cache miss cannot be ruled out if any one of the instructions executed immediately before the stalled instruction accesses memory. This is because the memory access may displace the cache line containing the stalled instruction to make room for the data being accessed.

The above analysis assumes that instruction execution always follows the order dictated by the control flow graph. Interrupts may cause this assumption to be violated. However, the assumption remains reasonable in a statistical sense because interrupts occur relatively infrequently and at random points in the instruction stream. In addition, exceptions may also invalidate the assumption.

Alternatively, the impact of I-cache misses can be assessed by statistically sampling the program counter on I-cache miss events. Over time, this method can produce an accurate estimate of how often each instruction is stalled because of an I-cache miss. From this estimate, the upper bound on the number of stall cycles (incurred by this instruction) that can be attributed to I-cache misses is computed. Specifically, the upper bound is the product of:
(a) the number of I-cache miss events observed for this instruction,
(b) the sampling period for I-cache misses (every one out of this many I-cache misses are sampled), and
(c) the maximum penalty of an I-cache miss (typically the access latency of main memory).

The result is divided by the estimated number of times the stalled instruction is executed to obtain an average value. If this average value is small (say, less than half a cycle), I-cache miss may be ruled out as a possible explanation for the stall. Otherwise, the reason is presented to the user for information.

The analysis for ITB misses is analogous, except that a "cache line" in the preceding discussion should be interpreted as a "virtual memory page."

Ruling out D-cache or DTB miss

A dynamic stall may also occur when a data cache (D-cache) is accessed by a load instruction but the required data is not in the D-cache. This is called a D-cache miss. Similarly, a dynamic stall may occur when the data translation look-aside buffer (DTB) is accessed to translate a virtual memory address for data into a physical memory address, but the required translation entry is not in the DTB, called a DTB miss.

Different processor implementations may behave differently when a D-cache or DTB miss occurs. In some implementations, the load instruction itself is stalled. In this case, a D-cache or DTB miss can be ruled out if the stalled instruction is not a load instruction. In some other implementations, the load is issued without a delay, but any instruction using the result of the load will be stalled until the result actually becomes available. In this case, the order in which registers are read and written in the instruction stream has to be analyzed.

A D-cache or DTB miss can be ruled out if certain conditions are satisfied by the order and manner in which registers are read and written in the instruction stream.

To determine whether a stalled instruction may have stalled due to a D-cache or DTB miss, each register that it references is considered.

Figure 12:
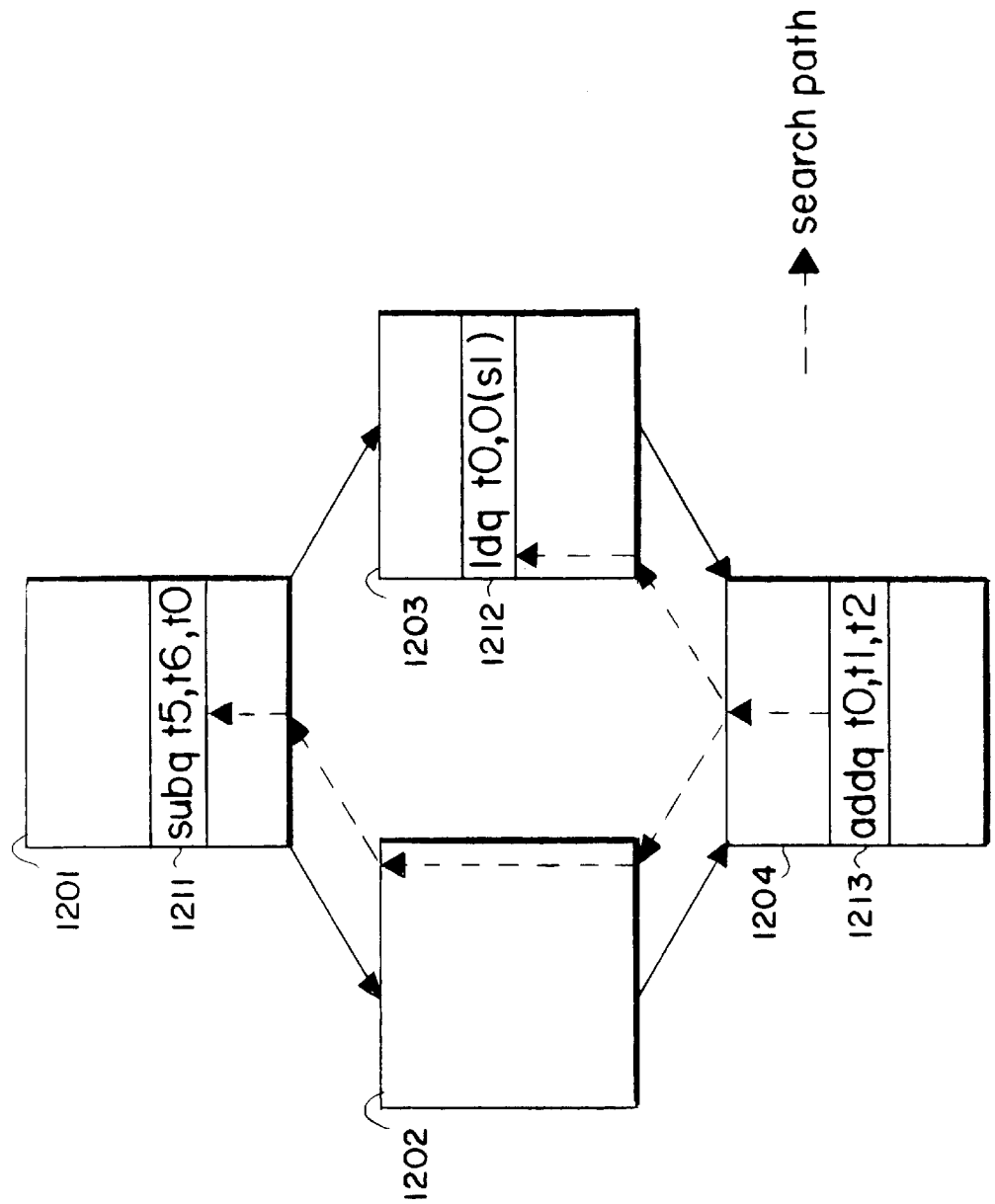
FIG. 12 is a block diagram of a procedure referenced by a stalled instruction.

FIG. 12 illustrates the analysis which can be performed for ruling out stalls due to data misses. In FIG. 12, execution proceeds from block 1201 to either block 1202 or block 1203; block 1204 is executed after block 1202 or 1203 is executed. Instruction 1213 is stalled due to the fact that the data required to resolve the reference by, for example, register t0 is not immediately available.

For the register t0, the instruction(s) 1211–1212 that last referenced the register t0 of the stalled instruction 1213 are identified in a way detailed in the next paragraph. If any such instructions loads data from memory into the register t0, then a D-cache or DTB miss is considered a possible explanation for the stall; the instruction is identified as a culprit. This is applied to each register referenced by the stalled instruction. If none of these registers yields a culprit, a D-cache or DTB miss is ruled out as a possible explanation for the stall. In FIG. 12, for instance, a D-cache or DTB miss is possible, with the load instruction 1212 as the culprit.

To find all the instructions that this analysis should consider, the instructions before the stalled instruction in the same block are first examined in descending order of their addresses. If none of them references the register, instructions in basic blocks from which control may flow to the stalled instruction are also examined (again in descending order of address for the instructions in any given basic block) except that basic blocks executed much less often than the one containing the stalled instruction can be ignored. A threshold can be computed as a small percentage of the stalled instruction's frequency estimate, and basic blocks whose frequency estimate is below this threshold can be ignored.

This examination of basic blocks can be carried out, for example, by performing a depth-first search in the reversed control flow graph (formed by reversing the directions of all control flow arcs in the original) starting from the basic block containing the stalled instruction, see Hopcroft et al., *Efficient Algorithms for Graph Manipulation,* Communications of the ACM, 16(6):372–378, 1973. In this search, a basic block's neighbors need not be visited if the basic block itself contains an instruction referencing the register in question.

Although the preferred embodiment is described with reference to a computer system in which data and instructions have distinct caches and distinct translation look-aside buffers, the method for ruling out I-cache, ITB, D-cache, and DTB misses also apply to processors and computer systems in which data and instructions share a single cache, or data and instructions share a single translation look-aside buffer, or both.

However, if data and instructions share a single cache or translation look-aside buffer, additional reasons must be considered for a D-cache or DTB miss. For example, suppose a memory location A is loaded by one instruction, a subsequent instruction in the same basic block incurs a cache miss on the instruction itself and displaces the data at location A from the cache, and then a later instruction still in the same basic block attempts to load A; the second load of A will miss in the cache. Information about I-cache misses can be used to rule out such situations.

Ruling out branch misprediction

A dynamic stall may also occur when the actual target of a branching instruction differs from the target predicted by a processor's branch prediction logic. This is called a branch misprediction. "Branching instructions" here mean instructions that may alter a program's flow of control; they include not only instructions commonly called "branches," but also "jumps," subroutine call and return instructions, etc.

How much branch misprediction contributes to a stall can be estimated by computing an upper bound on the frequency of branch mispredictions that could occur when control reaches the stalled instruction in a way detailed below. Branch misprediction can be ruled out as a possible explanation for the stall if its contribution is below some suitable threshold; alternatively, its contribution could be presented to the user no matter how small it is.

The remaining paragraphs discuss how to handle stalled instructions at the beginning of basic blocks. If a stalled instruction is not the first instruction in a basic block, branch misprediction can immediately be ruled out as a possible explanation for the stall. No further analysis is needed.

Figure 11:
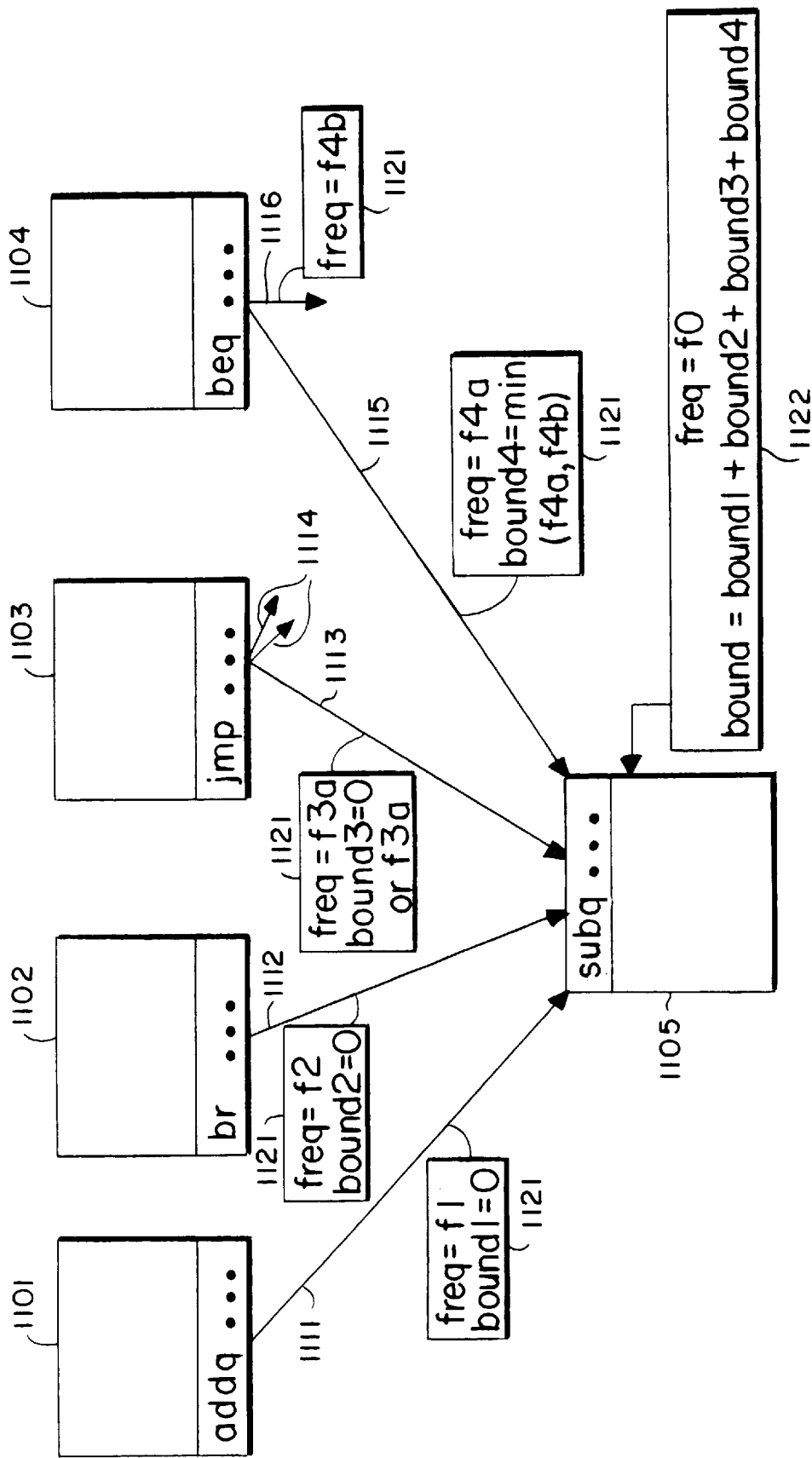
FIG. 11 is a block diagram of different types of predecessor blocks.

To find an upper bound on the frequency of branch mispredictions immediately preceding a stalled instruction, all basic blocks that may be executed immediately before the instruction are examined, as illustrated by FIG. 11. For this discussion, these basic blocks are called predecessor blocks (such as 1101, 1102, 1103, 1104); the control flow arcs from predecessor blocks to the basic block containing the stalled instruction (subq) are called predecessor arcs (such as 1111,

1112, 1113, 1115); the last instructions of predecessor blocks are called predecessor instructions (such as the addq, br, jmp, and beq instructions). Note, if all predecessor blocks are not known, for example, the basic block is the target of a "return" instruction from an unknown called subroutine, then the unknown predecessors can pessimistically be assumed to always mispredict.

A bound 1122 to be computed for the stalled instruction is the sum of individual bounds, one for each predecessor instruction. The individual bounds are shown as boxes 1121. There are four types of predecessor instructions. The first four are illustrated in FIG. 11, namely:

(1) Non-branching instructions, such as the addq instruction in the basic block 1101. The individual bound is set to zero: no branch misprediction can occur since no prediction needs to be made. The remaining cases concern branching instructions—instructions that may alter the execution flow.

(2) A branching instruction whose target address does not depend on dynamic program behavior (typically an unconditional branch), such as the br instruction in basic block 1102. The individual bound is set to zero: no branch misprediction can occur since the target address is known with certainty beforehand.

(3) A branching instruction whose predicted target address is encoded in the executable (e.g., as a program counter offset embedded in the machine code). An example is the jmp instruction in basic block 1103. The predicted target address is determined by examining the executable (e.g., by decoding the instruction). The target address is compared with the address of the stalled instruction.

If the two addresses are identical, the individual bound is set to zero: no branch misprediction can occur if control is transferred to the stalled instruction because that was the prediction. Otherwise, the individual bound is set to the frequency estimate for the corresponding predecessor arc: every control transfer to the stalled instruction differs from the prediction and hence is mispredicted. For example, the bound for arc 1113 would be set to zero if the predicted path were arc 1113, but to the frequency estimate for arc 1113 if the predicted path were arc 1114.

(4) A branching instruction that, based on the run-time state of the processor, conditionally transfers control to a statically known target address. An example is the beq instruction in basic block 1104. For this type of instructions, many processor designs use dynamic branch prediction techniques to predict whether the branch will be taken (i.e., control will be transferred) based on whether it was taken in previous execution(s) of the instruction.

If such techniques are used in the processor being analyzed, the individual bound is set to either the frequency estimate for the predecessor arc, or an estimate computed from the frequency estimate for the other control flow arc emanating from the predecessor block, hereinafter called the alternative arc, such as arc 1116 in FIG. 11, whichever the smaller. The latter estimate is chosen on the assumption that if the branch is taken much more often than not, or vice versa, then the dynamic branch prediction mechanism would be likely to correctly predict the outcome in most executions of the instruction.

Specifically, the estimate can be the frequency estimate for the alternative arc 1116 if the dynamic branch prediction mechanism employs a history table with one or more bits similar to the mechanism used in Digital Equipment Corporation's Alpha 21164 processor. This is the case illustrated for arc 1115 in FIG. 11.

(5) Other branching instructions (not illustrated in FIG. 11). For other types of branching instructions, other than those discussed above, it may be possible to use the analysis illustrated above to estimate a bound on the frequency of branch misprediction, otherwise, the individual bound is set to the frequency estimate for the predecessor arc: every control transfer along this arc is pessimistically assumed to be mispredicted.

Next, the upper bound on the frequency of branch mispredictions can be used to estimate the contribution of branch misprediction to the stall cycles of a given instruction. Specifically, this contribution can be computed as:

upper bound on frequency of branch misprediction divided by:

frequency of basic block containing stalled instruction all times:

penalty, where "penalty" is the number of pipeline stall cycles incurred during a branch misprediction. This number depends on the specific processor implementation.

Ruling out synchronization

Some processor architectures have instructions that perform synchronization operations with other processors, or with previous instructions executed on the same processor. These synchronization operations can also introduce dynamic stalls.

For example, Digital Equipment Corporation's Alpha microprocessor architecture has a "memory barrier" instruction (mb) that introduces dynamic stall cycles to serialize a processor's memory operations as viewed by other processors on a multiprocessor. The "trap barrier" instruction (trapb) introduces dynamic stalls until all preceding instructions are guaranteed to complete without incurring traps. Other processor architectures may have instructions for similar functions. Synchronization can be ruled out as a possible explanation for a stall if the stalled instruction performs no synchronization.

On some of Digital's Alpha microprocessors, an mb instruction can cause the next memory access instruction that occurs after it to stall. On these processors, synchronization via mb instructions can be ruled out as a possible explanation for a stall if the stalled instruction is not a memory access instruction, or if it is a memory access instruction but no mb instruction can occur shortly before it in the instruction. Similarly, on these processors a trapb instruction itself stalls until all preceding instructions are guaranteed to complete without incurring traps; synchronization via trapb instructions can be ruled out as a possible explanation for a stall unless the stalled instruction is itself a trapb instruction.

Ruling out execution unit conflicts

A dynamic stall may also occur if an instruction needs one or more processor execution units that are not available when the instruction is otherwise ready for execution. For example, execution units may be unavailable while executing previous instructions. The set of execution units that may cause this kind of stall depends on the implementation of the processor. Execution units may include memory access units, register operation units, and integer multiply and floating point divide units.

For each such execution unit, conflict can be ruled out as a possible explanation for a stall if the stalled instruction does not need that execution unit. For example, an "add" instruction would never be stalled because of a conflict with the use of a floating point divide unit.

Ruling out write buffer overflow

A dynamic stall may also occur if a store instruction is otherwise ready for issue but the processor's write buffer, which handles memory write operations, is full because of previous write requests that are still being processed. This is called a write buffer overflow.

If a stalled instruction is not a store, a write buffer overflow can be ruled out as a possible explanation for the stall. Otherwise, write buffer overflow is considered unlikely if none of the "recently executed" instructions is a store. Specifically, instructions before the stalled instruction in the same basic block are examined in descending order of their addresses. If none of these instructions is a store, instructions in basic blocks from which control may flow to the stalled instruction are also examined, except, basic blocks executed much less often than the one containing the stalled instruction can be ignored. The search technique described previously in the handling of D-cache or DTB miss can be applied here. The search terminates when it reaches a store instruction or the entry point of the procedure.

Ruling out other sources of stalls

The discussion above covers most common reasons for pipeline stalls in existing processors. Other reasons in current or future processors can be ruled out by a similar analysis of the processor implementation to determine the resources needed by an instruction and the mechanisms that could cause a given type of instruction to stall, thus identifying static stalls and possible reasons for dynamic stalls. Where a dynamic stall is possible, the instructions leading up to a given instruction can be examined in the manner illustrated above to determine if any of them could cause the given instruction to stall.

Method and Apparatus D: A Hardware Performance Counter that Accurately Measures "Retired" Instructions In a preferred embodiment of the invention, the execution frequency of instructions can directly be measured using a specially designed hardware including a "retire" counter. The retire counter provides statistically sampled information about the number of times each instruction of the program is retired.

Figure 13:
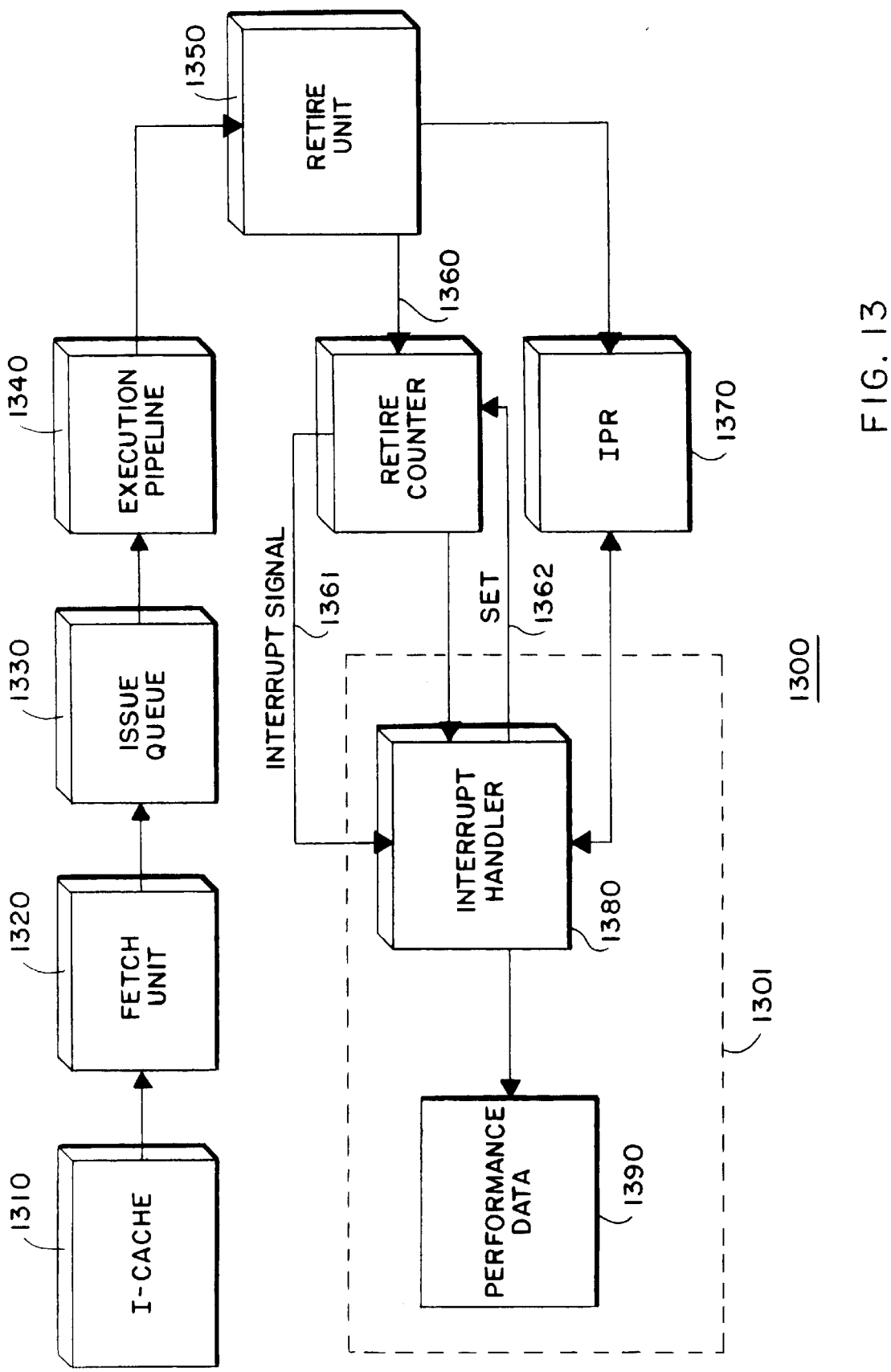
FIG. 13 is a block diagram of hardware including improved performance counters.

More specifically as shown in FIG. 13, the hardware 1300 includes a serially coupled instruction cache (I-cache) 1310, fetch unit 1320, issue queue 1330, execution pipeline 1340, retire unit 1350. The retire unit 1350 is coupled to a retire counter 1360 and an internal processor register 1370. In addition, the hardware can a memory 1301 storing an interrupt handler 1380, and performance data 1390.

During operation of the hardware, the fetch unit 1320 fetches instructions from the I-cache 1310 to queue up in the issue queue 1330. Instructions are presented from the issue queue to the execution pipeline 1340. In the preferred embodiment, multiple instructions can be issued during a single processor cycle. When an instruction successfully completes, the retire unit 1350 increments the retire counter 1360. A program counter (pc) value associated with the retired instruction is stored in the IPR 1370. The counter 1360 periodically generates an interrupt signal on line 1361. In response, the interrupt handler 1380 can sample the counter 1360 and IPR 1370 to generate performance data 1390. The sampled performance data will be substantial proportional to the number of times that an instruction at a particular program address (pc value) is retired.

The number of "retire" events which are accumulated in the counter can be selected by presetting the counter to generate an interrupt on the overflow of a specific bit of the counter. The counter 1360 can be set by signals on set lines 1362. An arbitrary interval between interrupts can be selected by setting the overflow bit position at the end of the interrupt handler. It is possible to choose intervals of random length. Alternatively, if the counter is implemented as a count-down register, the interval between interrupts can be selected by presetting the counter to a selected value. Here, the counter will interrupt on underflow, i.e., a zero value.

In prior art implementations of performance counters, the interrupt handler generally has access to the program counter (pc) value of the next instruction to be executed when the interrupt handler completes; this pc value is sometimes called the "exception address," or the "return pc".

However, simply recording this pc value does not accurately reflect the number of times the previous instruction was retired. In particular, if an instruction retires and the performance counter to overflows, the instruction has already been executed. In that case, the return pc does not reflect the pc value of the retired instruction.

Depending on the details of interrupt processing, the return pc might be the instruction in the instruction stream immediately after the one whose retirement caused the interrupt, or it might be an variable number of instructions later, depending dynamically on the number of instructions in various stages of the fetch unit, issue queue, and execute pipeline.

Therefore, if the interrupt handler 1380 simply records the return pc, then the sample counts recorded for each instruction using the "retire instruction" counter would not accurately reflect the execution frequency of the instructions.

Figure 14:
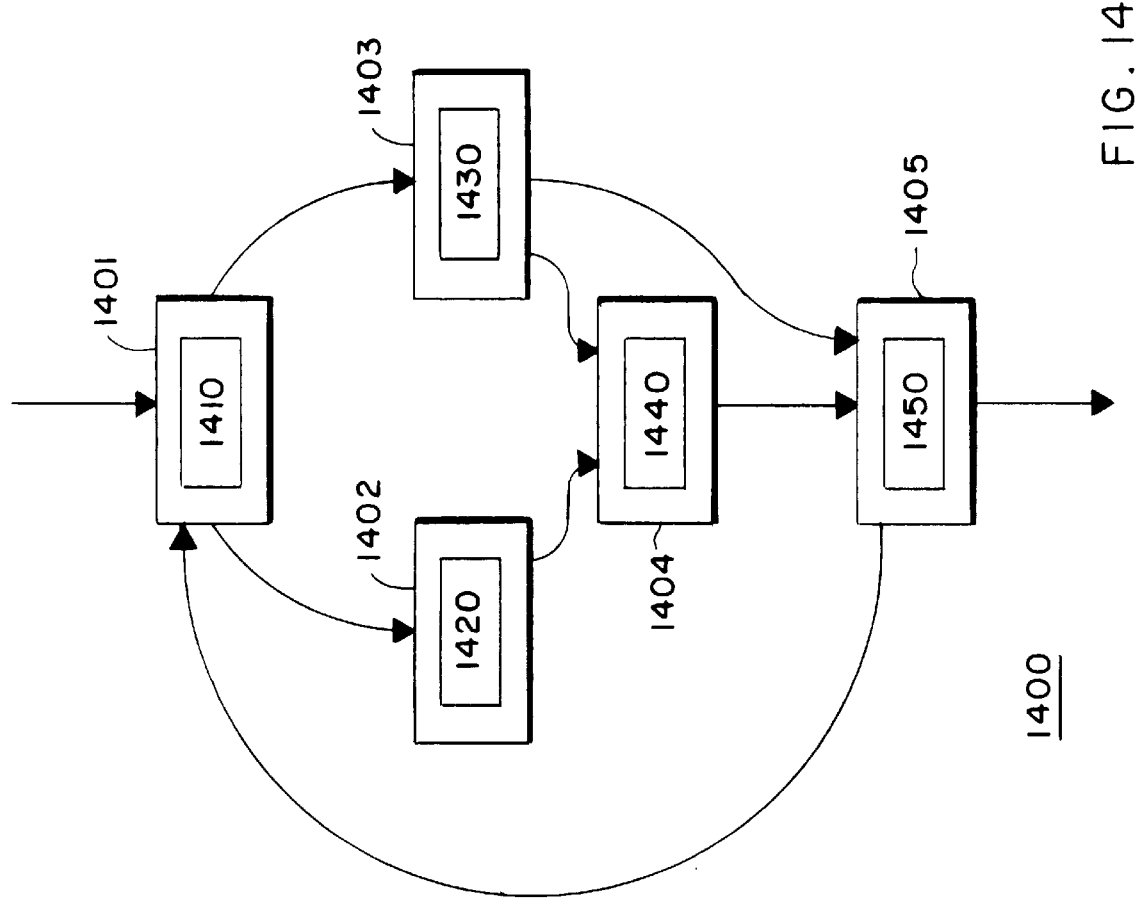
FIG. 14 is a diagram of basic blocks executing in a loop.

Consider the example control flow graph fragment 1400 shown in FIG. 14. There, five basic blocks 1401–1405 are organized in a loop, each basic block is composed of a single instruction (1410–1450). Whenever the instruction of the basic block retires, the "retire counter" overflows, and an interrupt is generated, the return pc value for the interrupt handler is the next instruction to be executed.

Thus, when the retirement of instruction 1420 generates an interrupt, the return pc value is instruction 1440; similarly, when instruction 1430 generates an interrupt, the return pc value is either instruction 1440 or instruction 1450, depending on the outcome of the conditional branch at instruction 1430. The sample counts recorded for a given pc value then reflect the retirement of multiple preceding instructions. For example, the sample count recorded for instruction 1440 is the result of all the retirements for instruction 1420 plus some of those for instruction 1430; similarly, the count recorded for instruction 1450 is the result of all the retirements for instruction 1440 plus some of those for instruction 1430. In general, given sample data of this form, it is impossible to determine unambiguously the number of retire events for each instruction.

By modifying the hardware as described herein, it can be ensured that the information recorded by the interrupt handler 1380 includes the program counter values of the instructions that are actually retired. The essential idea is to record, at the time the counter overflows and generates an interrupt, the program counter value of the exact instruction whose retirement caused the interrupt to be generated. This program counter value can be recorded in the internal processor register (IPR) 1370 of FIG. 13. The IPR can be read, for example, by privileged instructions executed by the interrupt handler 1380.

The program counter value can be made available to the retire unit 1350 in several ways. The values can be carried through the entire processor pipeline along with the instructions. More typically, the identity of an instruction as it progresses through the pipeline is a relatively small instruction number, or "inum." The size of inum does not need to be any larger than the total number of instructions which can be in the pipeline at any one time.

Figure 15:
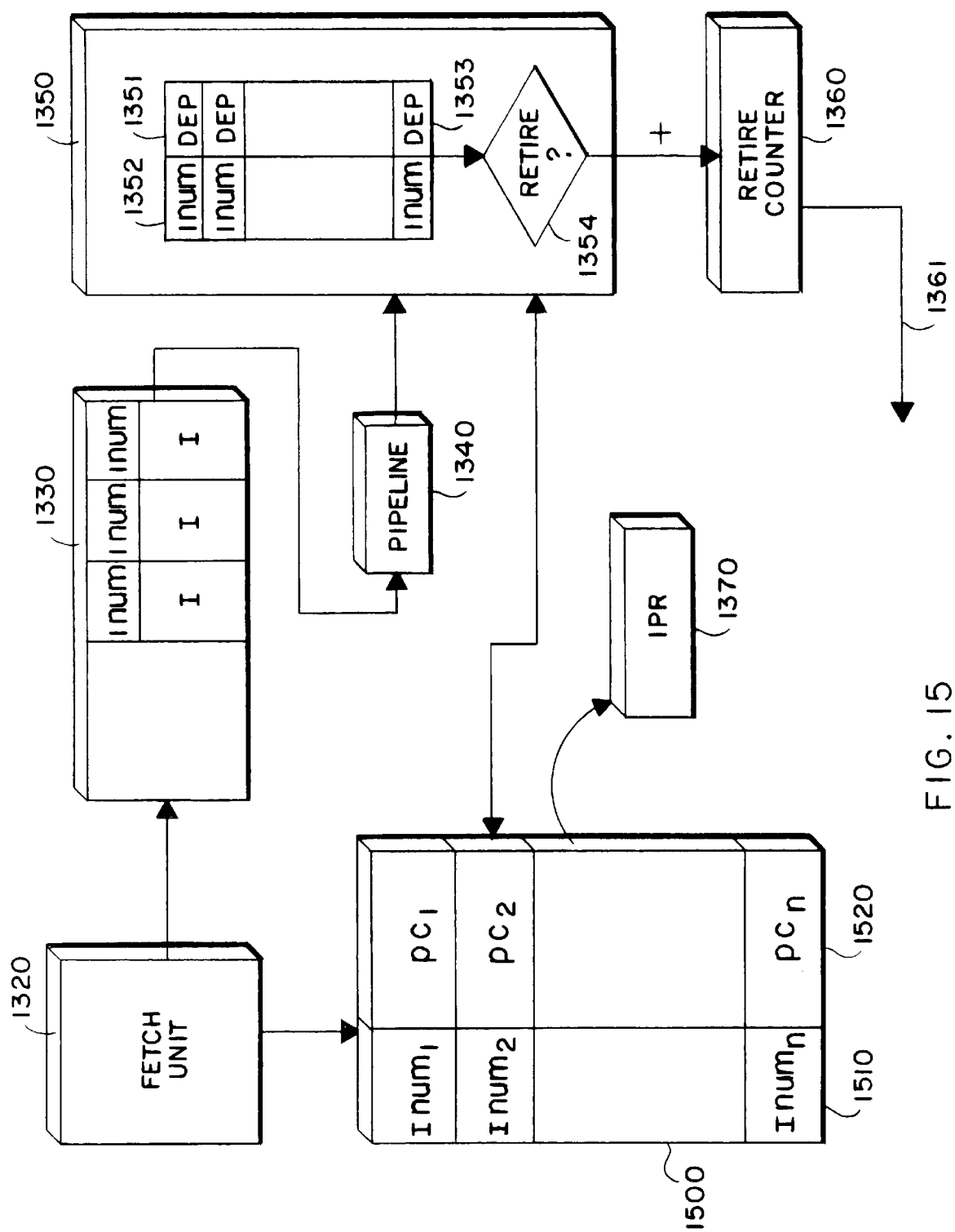
FIG. 15 is a data flow diagram of a performance data collection process including a table for looking up program counter values.

As shown in FIG. 15, the mapping of the inum identifications 1510 of executing instructions to their program counter values 1520 can be done by use of a table 1500. The retire unit 1350 maintains a queue 1351 of the inums 1352 of instructions that are waiting to be retired, i.e., instructions in the pipeline, along with other dependency information (DEP) 1353 that is used to determine when each instruction can retire. The decision is made by logic 1354. When an instruction is retired, its inum identification 1352 is used to extract the corresponding pc value 1520 from the table 1500. This pc value can then be stored in the IPR 1370.

The interrupt signal 1361 which is generated to record a sample when the retire counter 1360 overflows need not be generated immediately, since the pc value of the retired instruction is available in the IPR 1370. This value will not be changed until the next interrupt. Thus, when the design of the processor's pipeline is such that it takes several cycles to obtain the pc value of the retired instruction, it is acceptable to generate the interrupt 1361 some time after the pc value has been written into the IPR 1370.

On some processors, multiple instructions can be retired during a single processor cycle. However, instructions are usually retired in "program order", that is, the order in which they would be executed if they were executed one at a time. This is usually true even on processors that can issue instructions out of order.

Thus, when a group of instructions is retired during the same processor cycle, to cause the retire counter to overflow, it is possible to identify at least one of the retiring instructions as the one that caused the overflow. For example, the retire counter is set to overflow when it reaches a value X, the processor retirement cycle starts at a value X-N, and K instructions retire during that cycle. In this case, the Nth instruction in the group of K instructions is the one that caused the overflow, and its pc value should be stored in the IPR 1370.

This technique can be extended to other kinds of performance counters for other kinds of events. In general, for any event it may be desirable to record information relevant to that event, for example, the pc value of the instruction that caused the event can be recorded, or the virtual address of data accessed by a memory operation that misses in the cache can be recorded. By maintaining a set of IPRs 1370 for this additional data and updating the IPRs 1370 whenever the appropriate event counter overflows, sample data reflecting the rate of a given event for each individual instruction or memory location can directly be obtained.

Method for improving the quality of sampled execution frequency data.

The data produced by the hardware described tends to be noisy. The data may also include potentially significant statistical variations. These variations can be reduced in a postprocessing step as follows:

1. Group the basic blocks in each procedure's control flow graph into frequency-equivalence classes, as described above. Except in rare circumstances (e.g., when a procedure calls another procedure that jumps to code in a third procedure, terminating the first procedure, or when an interrupt occurs that never returns to the interrupted code), all of the basic blocks in a given frequency-equivalence class are guaranteed to execute the same number of times in each execution of a program; hence, all of the instructions in each of those basic blocks also execute the same number of times.

2. For each frequency-equivalence class, determine a new execution-frequency estimate by taking the average of the sample counts for each of the instructions in the class.

It will be apparent to those skilled in the art that various modifications can be made to the present invention without departing from the spirit and scope of the invention as set out in the appended claims.

We claim:

1. A computerized method for analyzing performance data of a computer system executing instructions of a program, comprising the steps of:

analyzing the program to determine equivalence classes of instructions, each equivalence class containing instructions that have the same execution frequency as each other instruction in that equivalence class;

collecting performance data while executing the instructions of the program; and estimating an execution frequency for each instruction in the program based on the collected performance data and the determined equivalence classes.

2. The method of claim 1 further comprising:

providing an instruction scheduler with an input array of the instructions of the program to determine a minimum number of cycles required to issue each instruction of the program; and determining the average number of cycles required to dynamically issue each instruction of the program while the program is executing.

3. The method of claim 2 further comprising:

determining the number of static stall cycles and the number of dynamic stall cycles incurred while issuing each instruction of the program.

4. The method of claim 3 further comprising:

determining reasons for the dynamic stall cycles incurred by each instruction of the program.

5. The method of claim 3 further comprising:

identifying all possible reasons that could cause a particular instruction to incur dynamic stall cycles; and eliminating reasons which can be ruled out as reasons for the particular instruction to have dynamic stall cycles to determine the possible reasons that caused the particular instruction to incur dynamic stall cycles.

6. The method of claim 5 further comprising:

eliminating instruction-cache misses as a reason depending on a memory address of the particular instruction.

7. The method of claim 5 further comprising:

eliminating data-cache misses as a reason depending on how registers of the processor are referenced by the particular instruction and by previously executed instructions.

8. The method of claim 7 further comprising:

identifying the previously executed instructions by conducting a depth-first search of the control flow graph beginning at the particular instruction.

9. The method of claim 5 further comprising:

eliminating branch misprediction as a reason depending on a location of the particular instruction within a particular basic block.

10. The method of claim 5 further comprising:

eliminating process synchronization as a reason depending on an operator code of the particular instruction and instructions executed immediately preceding the particular instruction.

11. The method of claim 5 further comprising:
eliminating execution unit conflicts as a reason depending on an operator code of the particular instruction.

12. The method of claim 5 further comprising:
eliminating write buffer overflow as a reason depending on an operator code of the particular instruction.

13. The method of claim 2, further comprising the step of:
determining a number of dynamic stalls incurred while issuing each instruction of the program based on the average number of cycles required to issue that instruction and the minimum number of cycles determined for that instruction.

14. The method of claim 1 further comprising:
representing procedures of the program as a control flow graph having nodes and arcs, each node representing a basic block of the program, and the arcs representing execution flows between the basic blocks and the procedures, each instruction of a particular basic block being executed an identical number of times so that the instructions of the basic block form an equivalence class of instructions.

15. The method of claim 14 further comprising:
identifying all nodes and arcs of the control flow graph which have an identical execution frequency;
assigning all the nodes having the identical execution frequency to the same equivalence class.

16. The method of claim 14 further comprising the step of augmenting the control flow graph by:
identifying an entry node and an exit node of each procedure;
connecting the entry and exit nodes of the procedure to each other by a new arc;
decomposing the nodes and arcs of the procedure into strongly connected sub-graphs;
identifying a particular strongly connected sub-graph as a dead-end component if there are no arcs from any of the nodes of the particular strongly connected sub-graph to any nodes in any other strongly connected sub-graph;
redirecting all arcs entering any dead-end component to the exit node of the procedure; and
identifying cycle equivalent nodes and arcs in each of the dead-end components and in the remaining part of the augmented control flow graph excluding the dead-end components to determine the frequency equivalence classes.

17. The method of claim 14 wherein the estimating step first estimates the execution frequency for nodes and arcs of a particular frequency equivalence class that excludes instructions that might incur dynamic stall cycles.

18. The method of claim 17 further comprising:
locally propagating the estimated frequencies of the nodes and arcs of the particular frequency equivalence class to nodes and arcs that are immediately adjacent to the nodes and arcs of the particular frequency equivalence class using flow-in and flow-out constraints of the control flow graph.

19. The method of claim 18 further comprising:
estimating execution frequencies for another frequency class that has at least one issue point.

20. The method of claim 1 wherein the performance data includes sample counts of the instructions, and further comprising:
removing sample anomalies;
ideally scheduling the instructions of the program to determine the minimum number of cycles required to issue each instruction of the program, the minimum number of cycles including the number of static stall cycles incurred by each instruction during issuance;
normalizing the sample counts for each instruction by dividing the sample counts for each instruction by the minimum number of cycles required to issue that instruction;
determining the execution frequency for each equivalence class using the normalized sample counts, the execution frequency being proportional to the number of times each instruction was retired;
dividing the sample count of each instruction by the execution frequency of the equivalence class of that instruction to determine the average number of cycles required to issue the instruction; and
determining the number of dynamic stall cycles incurred by each instruction of the program by subtracting the minimum number of cycles of each instruction from the average number of cycles for that instruction.

21. The method of claim 1 further comprising the steps of:
concurrently issuing, during a single processor cycle, multiple instructions from an issue queue; and
identifying a particular one of the multiple concurrently issued instructions at the head of the issue queue as an issue point.

22. The method of claim 21 further comprising the steps of:
providing an instruction scheduler with an input array of the instructions of the program to produce an ideal schedule of the instructions and static dependencies of the ideal schedule of the instructions;
determining for each node and arc of the control flow graph the execution frequency and a confidence value of the execution frequency for each node and arc;
grouping nodes and arcs having identical execution frequencies into the same equivalence class; and
determining for each instruction the number of cycles that instruction is expected to be at the head of the issue queue.

23. The method of claim 21 wherein the performance data includes sample counts of each instruction, and further comprising the step of:
setting the execution frequency of a particular equivalence class to zero if the particular equivalence class includes at least one issue point, and all instructions of that particular equivalence class have a sample count of zero.

24. The method of claim 1 further comprising:
applying a constraint solver to the estimated execution frequencies to revise the estimated execution frequencies.

25. The method of claim 1 further comprising:
averaging the performance data for the instructions that have the same execution frequency to reduce the statistical variation of the performance data.

26. The method of claim 1, further comprising the step of:
determining the average number of cycles required to issue each instruction of the program based on the collected performance data and determined execution frequency for that instruction.

27. The method of claim 1, further comprising the step of:
determining a minimum number of cycles required to issue each instruction of the program; and wherein the estimated execution frequency for each instruction is based on the determined minimum number of cycles for that instruction.

28. The method of claim 1, further comprising the step of:

determining a number of dynamic stalls incurred while issuing each instruction of the program depending on the estimated execution frequency for that instruction.

29. A computerized method for analyzing the performance of a computer system executing instructions of a program, comprising the steps of:

analyzing the program to determine equivalence classes of instructions, each equivalence class containing instructions that have the same execution frequency as each other instruction in that equivalence class;

collecting performance data while executing the instructions of the program; and estimating, based on the collected performance data and equivalence classes, the number of cycles required to issue each of the instructions of the program to a processor of the computer system.

30. The method of claim 29, further comprising the step of:

determining a number of dynamic stalls incurred while issuing each instruction of the program depending on the number of cycles required to issue that instruction.

* * * * *